United States Patent
Ang et al.

(10) Patent No.: US 11,617,176 B2
(45) Date of Patent: Mar. 28, 2023

(54) SWITCHING BWP IN RESPONSE TO OBTAINING AN INDICATION

(71) Applicant: QUALCOMM Incorporated, San Diego, CA (US)

(72) Inventors: Peter Pui Lok Ang, San Diego, CA (US); Prashanth Haridas Hande, San Diego, CA (US); Ravi Agarwal, San Diego, CA (US); Rahul Kashyap, San Diego, CA (US); Jafar Mohseni, San Diego, CA (US); Mahbod Ghelichi, San Diego, CA (US); Peerapol Tinnakornsrisuphap, San Diego, CA (US); Jay Kumar Sundararajan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 60 days.

(21) Appl. No.: 17/202,284

(22) Filed: Mar. 15, 2021

(65) Prior Publication Data
US 2021/0289502 A1    Sep. 16, 2021

Related U.S. Application Data

(60) Provisional application No. 62/990,411, filed on Mar. 16, 2020.

(51) Int. Cl.
*H04W 72/04*    (2009.01)
*H04W 28/02*    (2009.01)
(Continued)

(52) U.S. Cl.
CPC ....... *H04W 72/0453* (2013.01); *H04L 5/0042* (2013.01); *H04L 5/0064* (2013.01);
(Continued)

(58) Field of Classification Search
CPC ......... H04W 72/0453; H04W 28/0278; H04W 72/042; H04W 72/1278; H04W 72/1236;
(Continued)

(56) References Cited

U.S. PATENT DOCUMENTS

| 2004/0154041 A1* | 8/2004 | Zhang | H04N 21/23406 725/74 |
| 2020/0304272 A1* | 9/2020 | Lee | H04L 5/0064 |
| 2021/0105776 A1* | 4/2021 | Jiang | H04W 72/0453 |

FOREIGN PATENT DOCUMENTS

| WO | WO-2018144873 A1 * | 8/2018 | ........... H04B 7/0695 |
| WO | WO-2019080014 A1 * | 5/2019 | ............ H04W 16/04 |

OTHER PUBLICATIONS

English Translation of WO-2019080014-A1. 2019. Retrieved from PE2E Search on Jul. 14, 2022. (Year: 2019).*

(Continued)

*Primary Examiner* — Omar J Ghowrwal
(74) *Attorney, Agent, or Firm* — Patterson & Sheridan, LLP

(57) ABSTRACT

Certain aspects of the present disclosure provide techniques for wireless communication and more particularly, to techniques for bandwidth part adaptation for extended reality (XR) power saving. A method that may be performed by a UE generally includes receiving a first configuration of a first bandwidth part (BWP) and a second configuration of a second BWP, wherein the first BWP is configured for a lower traffic rate and the second BWP is configured for a higher traffic rate; obtaining an indication to switch from the (Continued)

first BWP to the second BWP; and switching from the first BWP to the second BWP in response to obtaining the indication.

28 Claims, 15 Drawing Sheets

(51) Int. Cl.
  *H04W 72/12* (2009.01)
  *H04L 5/00* (2006.01)
  *H04W 72/0453* (2023.01)
(52) U.S. Cl.
  CPC ....... *H04L 5/0098* (2013.01); *H04W 28/0278* (2013.01); *H04W 72/042* (2013.01); *H04W 72/1278* (2013.01); *H04W 72/1236* (2013.01); *Y02D 30/70* (2020.08)
(58) Field of Classification Search
  CPC ..... Y02D 30/70; H04L 5/0098; H04L 5/0042; H04L 5/0064
  See application file for complete search history.

(56) References Cited

OTHER PUBLICATIONS

CMCC: "Discussion on UE Power Saving Schemes with Adaption to UE traffic", 3GPP TSG RAN WG1 #96, 3GPP Draft; R1-1903344, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 25, 2019-Mar. 1, 2019, Feb. 22, 2019 (Feb. 22, 2019), 14 Pages, XP051601021, Retrieved from the Internet: URL: http://www.3gpp.org/ftp/tsg%5Fran/WG1%5FRL1/TSGR1%5F96/Docs/R1%2D1903344%2Ezip [retrieved on Feb. 22, 2019] section 4.
International Search Report and Written Opinion—PCT/US2021/022586—ISA/EPO—dated May 31, 2021.
Qualcomm Incorporated: "Remaining Issues on BWP", 3GPP TSG RAN WG1 Meeting #92, 3GPP Draft; R1-1802844, vol. RAN WG1, No. Athens, Greece; Feb. 26, 2018-Mar. 2, 2018, Feb. 17, 2018 (Feb. 17, 2018), pp. 1-24, XP051398257, Retrieved from the Internet: URL: http://www.3gpp.org/ftp/tsg_ran/WG1_RL1/TSGR1_92/Docs [retrieved on Feb. 17, 2018], Sections 1-3.

* cited by examiner

| 5QI Value | PDB | PER | Default MDBV | Example Services |
|---|---|---|---|---|
| 1 | 100 ms | 10^-2 | N/A | Conversation Voice |
| 2 | 150 ms | 10^-3 | N/A | Conversational Video |
| 6, 8, 9 | 300 ms | 10^-6 | N/A | Video; TCP-based |
| ... | ... | ... | ... | ... |
| 80 | 10 ms | 10^-6 | N/A | Low Latency eMBB applications; Augment Reality |
| 81 | 5 ms | 10^-5 | 160 B | Remote Control |
| ... | ... | ... | ... | ... |

FIG. 3

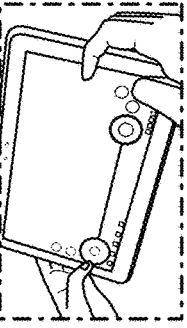

FIG. 4

| | VR Split Rendering | AR Split Computation | Cloud Gaming |
|---|---|---|---|
| HMD/Device | Head-mounted with 5G modem attached | Head-mounted with USB/Bluetooth connection to "Puck" or Smartphone with 5G modem | 5G Smartphone or Tablet |
| 5G Usage | QoS | QoS | OTT/QoS |
| Location | Enterprise-Indoor, Residential-Indoor, Outdoor | Enterprise-Indoor, Outdoor | Outdoor |
| Mobility | Limited to head movements and restricted body movements, Hi-speed (VR in the back of a car) | Pedestrian, Hi-speed | Static, Hi-speed |

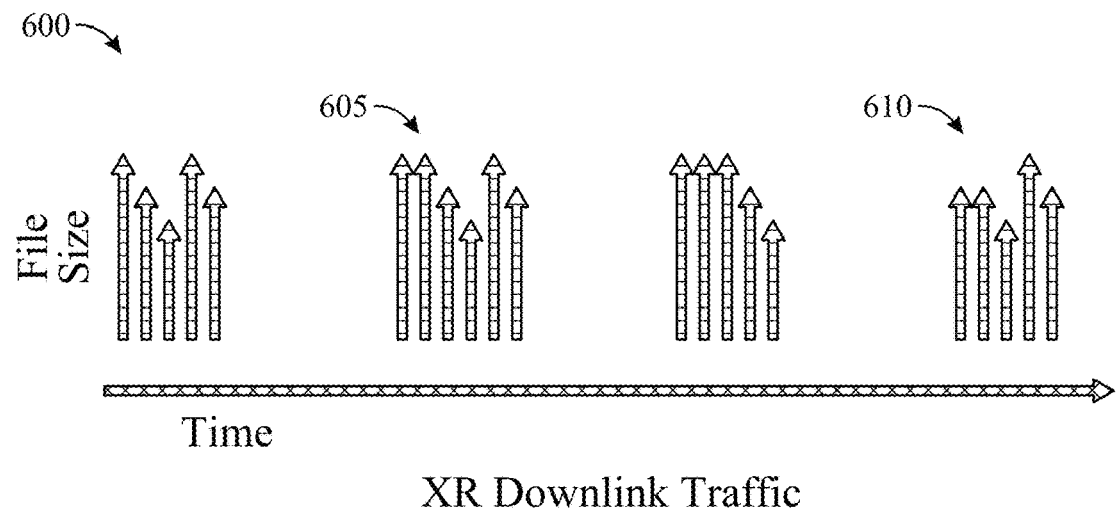
XR Downlink Traffic
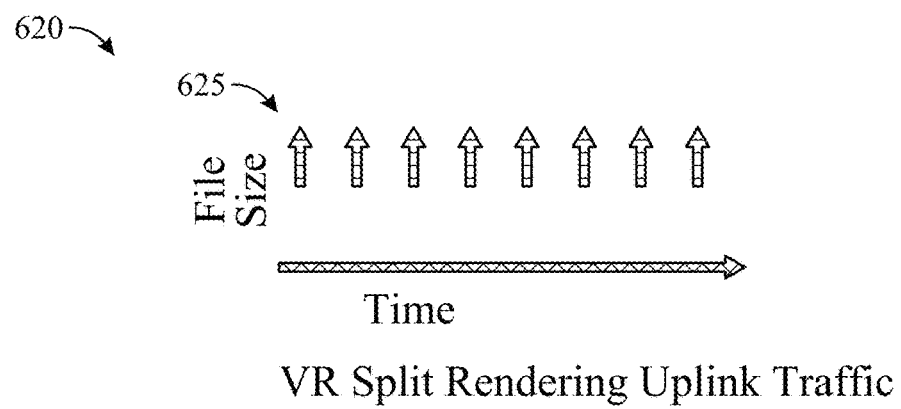
VR Split Rendering Uplink Traffic
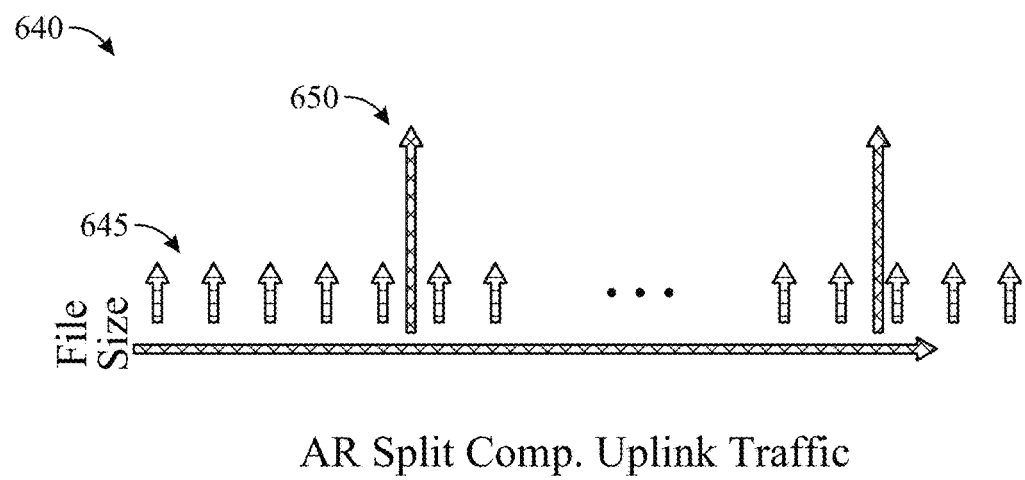
AR Split Comp. Uplink Traffic
FIG. 6

SWITCHING BWP IN RESPONSE TO OBTAINING AN INDICATION

CROSS-REFERENCE TO RELATED APPLICATION

The present Application for Patent claims priority to U.S. Provisional Application No. 62/990,411, filed Mar. 16, 2020, which is hereby expressly incorporated by reference herein in its entirety.

BACKGROUND

Field of the Disclosure

Aspects of the present disclosure relate to wireless communications, and more particularly, to techniques for bandwidth part adaptation for power saving.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, next generation NodeB (gNB or gNodeB), TRP, etc.). A BS or DU may communicate with a set of UEs on downlink channels (e.g., for transmissions from a BS or DU to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink and on the uplink. To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include power savings facilitated by adaptive bandwidth part switching.

Certain aspects provide a method for wireless communication performed by a user equipment (UE). The method generally includes receiving a first configuration of a first bandwidth part (BWP) and a second configuration of a second BWP, wherein the first BWP is configured for a lower traffic rate and the second BWP is configured for a higher traffic rate; obtaining an indication to switch from the first BWP to the second BWP; and switching from the first BWP to the second BWP in response to obtaining the indication.

Certain aspects provide a method for wireless communication performed by a base station (BS). The method generally includes transmitting, to a UE, a first configuration of a first BWP and a second configuration of a second BWP, wherein the first BWP is configured for a lower traffic rate and the second BWP is configured for a higher traffic rate; obtaining an indication to cause the UE to switch from the first BWP to the second BWP for the transmissions to the UE; and switching from the first BWP to the second BWP, for transmissions to the UE, in response to obtaining the indication.

Certain aspects provide an apparatus for wireless communications. The apparatus generally includes a processor configured to: receive a first configuration of a first BWP and a second configuration of a second BWP, wherein the first BWP is configured for a lower traffic rate and the second BWP is configured for a higher traffic rate; obtain an indication to switch from the first BWP to the second BWP; and switch from the first BWP to the second BWP in response to obtaining the indication; and a memory coupled with the processor.

Certain aspects provide an apparatus for wireless communications. The apparatus generally includes a processor configured to: transmit, to a UE, a first configuration of a first BWP and a second configuration of a second BWP, wherein the first BWP is configured for a lower traffic rate and the second BWP is configured for a higher traffic rate; obtain an indication to cause the UE to switch from the first BWP to the second BWP for the transmissions to the UE; and switch from the first BWP to the second BWP, for transmissions to the UE, in response to obtaining the indication; and a memory coupled with the processor.

Certain aspects provide an apparatus for wireless communications. The apparatus generally includes means for receiving a first configuration of a first BWP and a second configuration of a second BWP, wherein the first BWP is configured for a lower traffic rate and the second BWP is configured for a higher traffic rate; means for obtaining an indication to switch from the first BWP to the second BWP; and means for switching from the first BWP to the second BWP in response to obtaining the indication.

Certain aspects provide an apparatus for wireless communications. The apparatus generally includes means for transmitting, to a UE, a first configuration of a first BWP and a second configuration of a second BWP, wherein the first BWP is configured for a lower traffic rate and the second BWP is configured for a higher traffic rate; means for obtaining an indication to cause the UE to switch from the first BWP to the second BWP for the transmissions to the UE; and means for switching from the first BWP to the second BWP, for transmissions to the UE, in response to obtaining the indication.

Certain aspects provide a computer-readable medium. The computer-readable medium has instructions stored thereon for receiving a first configuration of a first BWP and a second configuration of a second BWP, wherein the first BWP is configured for a lower traffic rate and the second BWP is configured for a higher traffic rate; obtaining an indication to switch from the first BWP to the second BWP; and switching from the first BWP to the second BWP in response to obtaining the indication.

Certain aspects provide a computer-readable medium. The computer-readable medium has instructions stored thereon for transmitting, to a UE, a first configuration of a first BWP and a second configuration of a second BWP, wherein the first BWP is configured for a lower traffic rate and the second BWP is configured for a higher traffic rate; obtaining an indication to cause the UE to switch from the first BWP to the second BWP for the transmissions to the UE; and switching from the first BWP to the second BWP, for transmissions to the UE, in response to obtaining the indication.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 3 is a table illustrating various fifth generation (5G) quality indicators.

FIG. 4 is a table illustrating various use cases for extended reality (XR).

FIG. 6 shows three exemplary transmission timelines, according to aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
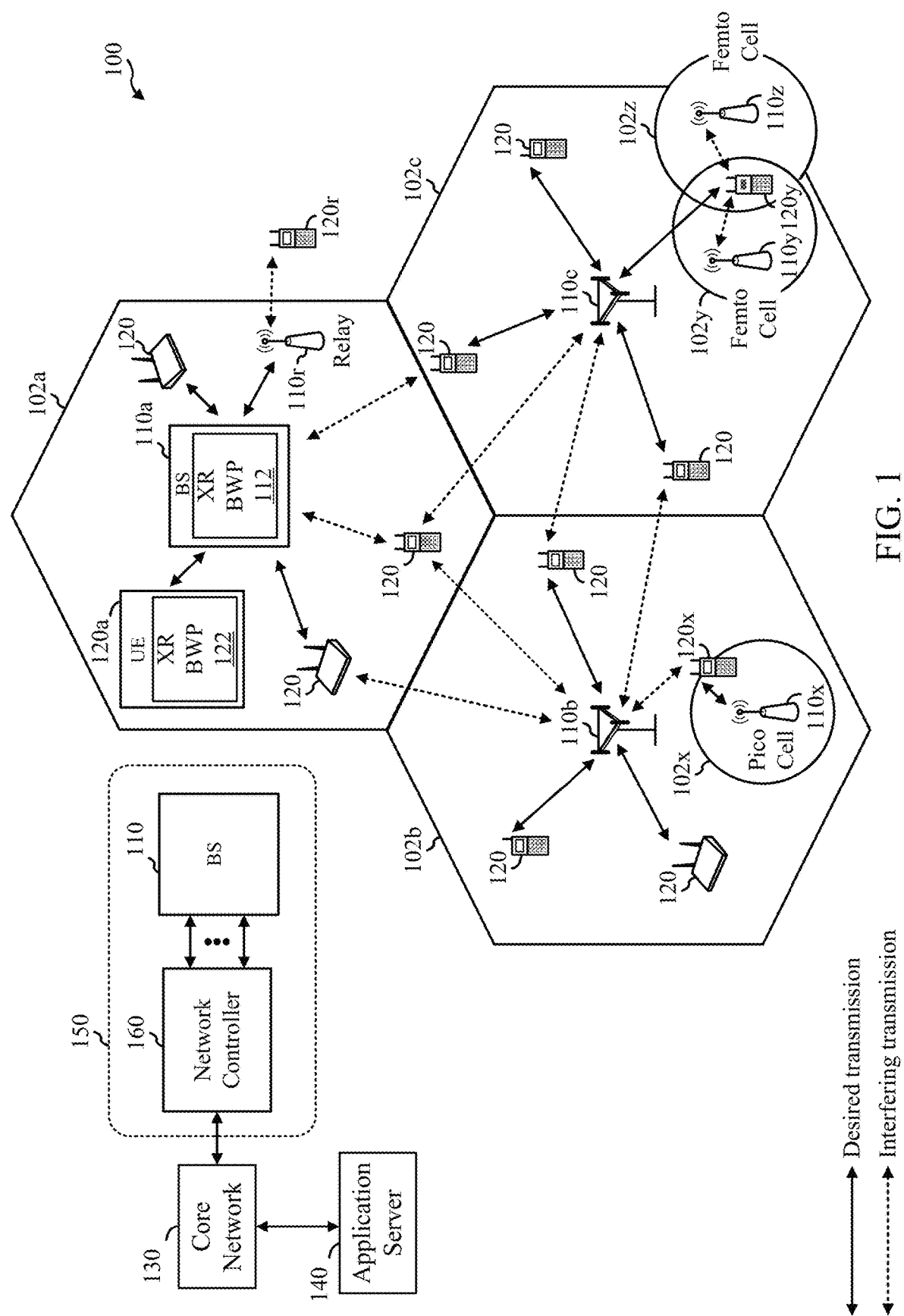
FIG. 1 is a block diagram conceptually illustrating an example telecommunications system, in accordance with certain aspects of the present disclosure.

Aspects of the present disclosure provide apparatus, methods, processing systems, and computer readable mediums for bandwidth part (BWP) adaptation power saving. For example, a UE may be configured with a first BWP for a first service and a second BWP for a second service, where the second service may have different quality of service parameters configured than the first BWP. The UE may be triggered to switch between the first BWP and the second BWP depending on when the second BWP will be used for traffic. The BWP adaptation may provide a framework for power saving advances, for example, for low latency and/or high reliability traffic such as extended reality (XR) or remote control applications.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably.

A CDMA network may implement a radio technology such as Universal Terrestrial Radio Access (UTRA), cdma2000™, etc. UTRA includes Wideband CDMA (WCDMA) and other variants of CDMA. cdma2000™ covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi™), IEEE 802.16 (WiMAX™), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000™ and UMB are described in documents from an organization named "3rd Generation Partnership Project 2" (3GPP2).

The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

FIG. 1 illustrates an example wireless communication network 100 in which aspects of the present disclosure may be performed. For example, the wireless communication network 100 may be an NR system (e.g., a 5G NR network). As shown in FIG. 1, the user equipment (UE) 120a includes an XR BWP module 122 that may be configured for receiving a first configuration of a first bandwidth part (BWP) and a second configuration of a second BWP, wherein the first BWP is configured for a lower traffic rate and the second BWP is configured for a higher traffic rate; for obtaining an indication to switch from the first BWP to the second BWP; and for switching from the first BWP to the second BWP in response to obtaining the indication. As shown in FIG. 1, the BS 110a also includes an XR BWP module 112 that may be configured for transmitting, to a user equipment (UE), a first configuration of a first bandwidth part (BWP) and a second configuration of a second BWP, wherein the first BWP is configured for a lower traffic rate and the second BWP is configured for a higher traffic rate; for obtaining an indication to cause the UE to switch from the first BWP to the second BWP for the transmissions to the UE; and for switching from the first BWP to the second BWP, for transmissions to the UE, in response to obtaining the indication, according to aspects described herein.

A radio access network (RAN) 150 may include a network controller 160 and a BS 110. The RAN 150 may be in communication with a core network 130 and an application server (AS) 140. According to certain aspects, the BSs 110 and UEs 120 may be configured for one or more services (e.g., ultra-reliable low-latency communications (URLLC), enhanced mobile broadband (eMBB), XR, etc.) involving traffic flows between the application provider (e.g., the application server 140) and/or BSs 110 and UEs 120 associated with one or more applications running on the UEs 120. For example, the UE 120a may be requesting admission (e.g., requesting the BS 110a to serve as a link between the UE 120a and the AS 140) for the one or more traffic flows for a service related to an application.

As illustrated in FIG. 1, the wireless communication network 100 may include a number of base stations (BSs) 110 and other network entities. A BS may be a station that communicates with user equipment (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. In some examples, a cell may not necessarily be stationary, and the geographic area of the cell may move according to the location of a mobile BS. In some examples, the BSs may be interconnected to one another and/or to one or more other BSs or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 160 may couple to a set of BSs and provide coordination and control for these BSs. The network controller 160 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

NR may utilize OFDM with a CP on the uplink and downlink and include support for half-duplex operation using TDD. Beamforming may be supported and beam direction may be dynamically configured. MIMO transmissions with precoding may also be supported. In some examples, MIMO configurations in the downlink may support up to 8 transmit antennas with multi-layer downlink transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In FIG. 1, a solid line with double arrows indicates desired transmissions between a UE and a serving BS, which is a BS designated to serve the UE on the downlink and/or uplink. A finely dashed line with double arrows indicates potentially interfering transmissions between a UE and a BS.

Figure 2:
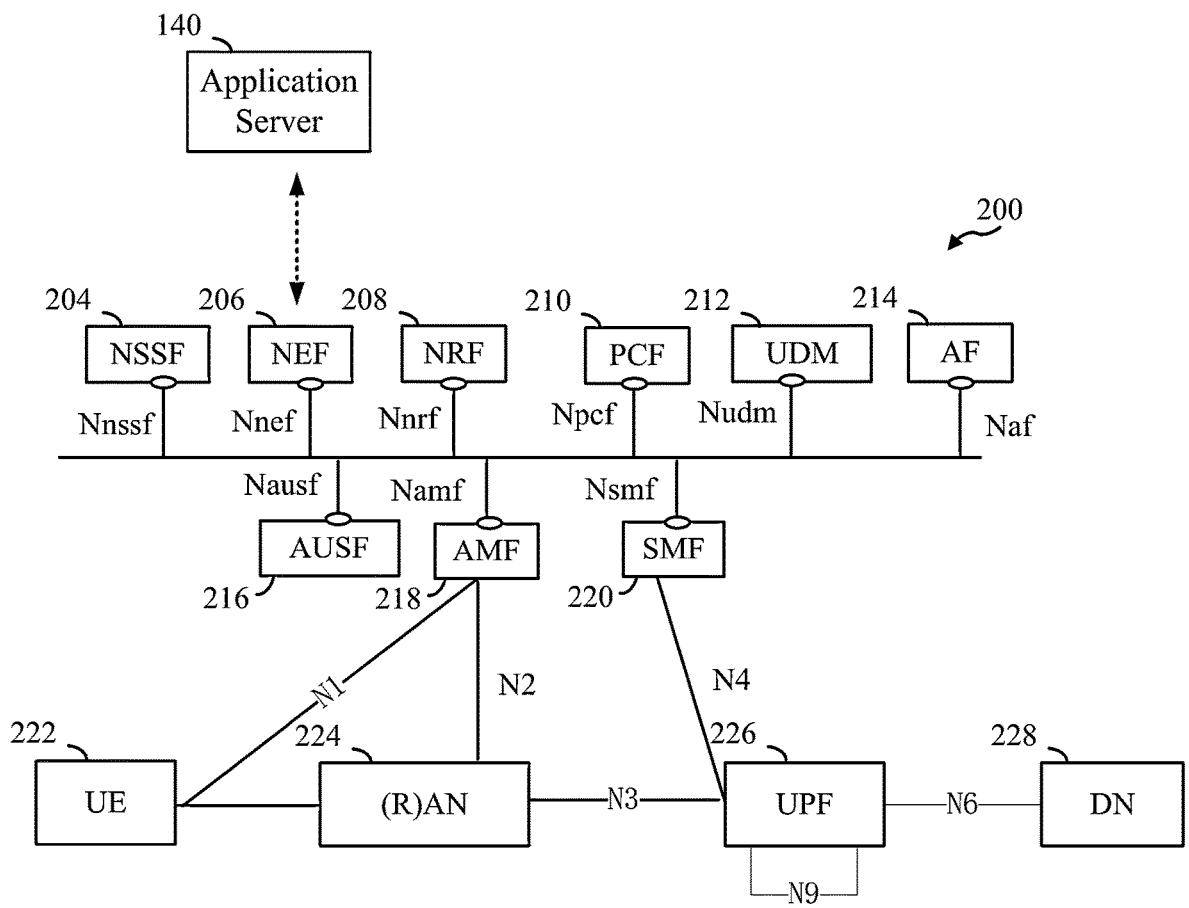
FIG. 2 is a block diagram illustrating an example architecture of a core network (CN) in communication with a radio access network (RAN), in accordance with certain aspects of the present disclosure.

FIG. 2 is a block diagram illustrating an example architecture of a CN 200 (e.g., such as the CN 130 in FIG. 1) in communication with a RAN 224 and AS 202 (e.g., such as the AS 140 in FIG. 1), in accordance with certain aspects of the present disclosure. As shown in FIG. 2, the example architecture includes the CN 200, RAN 224, UE 222, and data network (DN) 228 (e.g. operator services, Internet access or third party services).

The CN 200 may host core network functions. CN 200 may be centrally deployed. CN 200 functionality may be offloaded (e.g., to advanced wireless services (AWS)), in an effort to handle peak capacity. As shown in FIG. 2, the example CN 200 may be implemented by one or more network entities that perform network functions (NF) including Network Slice Selection Function (NSSF) 204, Network Exposure Function (NEF) 206, NF Repository Function (NRF) 208, Policy Control Function (PCF) 210, Unified Data Management (UDM) 212, Application Function (AF) 214, Authentication Server Function (AUSF) 216, Access and Mobility Management Function (AMF) 218, Session Management Function (SMF) 220; User Plane Function (UPF) 226, and various other functions (not shown) such as Unstructured Data Storage Function (UDSF); Unified Data Repository (UDR); 5G-Equipment Identity Register (5G-EIR); and/or Security Edge Protection Proxy (SEPP).

The AMF 218 may include the following functionality (some or all of the AMF functionalities may be supported in one or more instances of an AMF): termination of RAN control plane (CP) interface (N2); termination of non-access stratum (NAS) (e.g., N1), NAS ciphering and integrity protection; registration management; connection management; reachability management; mobility management; lawful intercept (for AMF events and interface to L1 system); transport for session management (SM) messages between UE 222 and SMF 220; transparent proxy for routing SM messages; access authentication; access authorization; transport for short message service (SMS) messages between UE 222 and a SMS function (SMSF); Security Anchor Functionality (SEAF); Security Context Management (SCM), which receives a key from the SEAF that it uses to derive access-network specific keys; Location Services management for regulatory services; transport for Location Services messages between UE 222 and a location management function (LMF) as well as between RAN 224 and LMF; evolved packet service (EPS) bearer ID allocation for interworking with EPS; and/or UE mobility event notification; and/or other functionality.

SMF 220 may support: session management (e.g., session establishment, modification, and release), UE IP address allocation and management, dynamic host configuration protocol (DHCP) functions, termination of NAS signaling related to session management, downlink data notification, and traffic steering configuration for UPF for proper traffic routing. UPF 226 may support: packet routing and forwarding, packet inspection, quality-of-service (QoS) handling, external protocol data unit (PDU) session point of interconnect to DN 228, and anchor point for intra-RAT and inter-RAT mobility. PCF 210 may support: unified policy framework, providing policy rules to control protocol functions, and/or access subscription information for policy decisions in UDR. AUSF 216 may acts as an authentication server. UDM 212 may support: generation of Authentication and Key Agreement (AKA) credentials, user identification handling, access authorization, and subscription management. NRF 208 may support: service discovery function, and maintain NF profile and available NF instances. NSSF may support: selecting of the Network Slice instances to serve the UE 222, determining the allowed network slice selection assistance information (NSSAI), and/or determining the AMF set to be used to serve the UE 222.

NEF 206 may support: exposure of capabilities and events, secure provision of information from external application to 3GPP network, translation of internal/external information. AF 214 may support: application influence on traffic routing, accessing NEF 206, and/or interaction with policy framework for policy control.

As shown in FIG. 2, the CN 200 may be in communication with the AS 202, UE 222, RAN 224, and DN 228. In some examples, the CN 200 communicates with the external AS 202 via the NEF 206 and/or AF 214.

A communication system such as the wireless communication network 100 (e.g., a RAN 224) may provide communication services to a UE (e.g., the UE 222; UE 120a). For example, 5G NR may support services such as enhanced mobile broadband (eMBB) service targeting wide bandwidth (e.g., 80 MHz or beyond), ultra-reliable low-latency communication (URLLC) service, and others including XR services discussed in more detail below. These services may include latency and reliability requirements. These services may also have different transmission time intervals (TTI) to meet respective quality of service (QoS) requirements.

The traffic requirements for a service may be summarized via a set of parameters (e.g., QoS parameters) and associated with the traffic flow that supports that service. The parameters may include the packet error rate (PER), packet delay budget (PDB), and/or a guaranteed bit rate (GBR) (not shown). The PER may be the ratio, in percent, of successfully received packets. For example, the PER may define an upper bound for the rate of PDUs (e.g. IP packets) that have been processed by the sender of a link layer protocol (e.g. RLC in RAN of a 3GPP access) but that are not successfully delivered by the corresponding receiver to the upper layer (e.g. PDCP in RAN of a 3GPP access). Thus, the PER may define an upper bound for a rate of non-congestion related packet losses. PDB may be defined as an upper bound for the time that a packet may be delayed between the UE (e.g., UE 222) and the UPF (e.g., UPF 226) on the CN side. The GBR may indicate the bandwidth (bit rate) to be guaranteed by the network.

A resource type may determine if dedicated network resources related to a QoS flow-level guaranteed flow bit rate (GFBR) value are permanently allocated (e.g., by an admission control function in a radio base station), while a non-GBR QoS flow may be pre-authorized through static policy and charging control. A GBR QoS flow may use either the GBR resource type or the Delay-critical GBR resource type. For traffic flows of type "Delay critical GBR" (e.g., for URLLC traffic flows), a parameter called Maximum Data Burst Volume (MDBV) is specified to describe the traffic burst. The MDBV denotes the largest amount of data that the 5G-AN is required to serve within a period of 5G-AN PDB (e.g., 5G-AN part of the PDB). The MDBV may be signaled together with a standardized indicator value (e.g., 5QI) to the (R)AN (e.g., RAN 224), and if it is received, it shall be used instead of the default value.

The Table 300 in FIG. 3 shows example QoS parameters that may be configured for various services. In some examples, the conversational voice service, the conversational video service (e.g., such as live streaming), and the video service (e.g., such as buffered streaming) and/or TCP-based service (e.g., such as the World Wide Web, email, chat, ftp, p2p file sharing, progressive video, etc.) may be associated with eMBB service. In some examples, remote control service (e.g., a UE being operated remotely, either by a human or a computer, such as a remote driver or a V2X application to operate a remote vehicle with no driver or a remote vehicle located in a dangerous environment) may be associated with URLCC. In some examples, the low-latency eMBB applications may be associated with XR service. XR service may refer to services such augmented reality (AR), virtual reality (VR), and cloud gaming. AR and VR service may be characterized by a human being interacting with the environment or people, or controlling a UE, and relying on audio-visual feedback. In the use cases like VR and interactive conversation the latency requirements include the latencies at the application layer (e.g., codecs), which could be specified outside of 3GPP.

The QoS parameters and services shown in the Table 300 in FIG. 3 are merely illustrative, and various other QoS parameters and services may be specified.

At high PDB values (e.g., equal to or exceeding 100 ms), the burst of a traffic over the PDB range may be closely approximated by the GBR*PDB. For some traffic flows, measured over every PDB, the percentile of times when the burst exceeds GBR*PDB is small relative to the PER. Dropping packets of such bursts will have negligible effect on the PER of the traffic. Thus, for such traffic flows it may not be important to convey the size of the traffic burst. However, for traffic flows at low PDB and low PER values, the volume of traffic that the 5G system handles can be much higher than GBR*PDB. In this case, it is useful to describe the traffic burst.

As mentioned above, the MDBV is specified for the traffic flows of type "Delay critical GBR" which are expected to handle traffic of low throughput. Thus, in some cases the range of values for MDBV is capped at 4095 Bytes (e.g., when signaled on 5G network interfaces). Even with a PDB of 1 ms, the throughput cap of 4095 Bytes implies that the maximum throughput on that flow can be no more than 4095 Bytes/ms (i.e., around 32.76 Mbps). The supported throughput may be even lower on traffic flows with larger PDB values. However, for certain services, such as XR services (e.g., AR, VR, cloud gaming), the throughput requirements (e.g., up to 250 Mbps) and PDB requirements (e.g., 25 ms) can be higher.

New Radio (NR) is an emerging wireless communications technology under development in conjunction with the 5G Technology Forum (5GTF). NR access (e.g., 5G NR) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency (e.g., file delay budget (FDB) and/or packet delay budget (PDB)) and reliability requirements (e.g., file error rate (FER) and/or packet error rate (PER)), and may also have different transmission time intervals (TTI) to meet respective quality of service (QoS) requirements. Extended reality (XR) is wireless communication service for services requiring low latency (e.g., a packet delay budget (PDB) of between 5 ms and 25 ms) and high bit-rate (e.g., a packet error rate of less than or equal to 1e−3).

FIG. 4 is a table 400 illustrating various use cases for XR. For example, virtual reality (VR) may be used for cloud gaming, VR split rendering, and augmented reality (AR) split computations. Cloud gaming generally refers to gaming on a user device where at least some of the graphical processor unit (GPU) processing is performed on a cloud server where more powerful GPUs may be implemented. Similarly, GPU processing for VR and AR may be split between a GPU on the cloud and a GPU on the user device. However, cloud gaming, split rendering, and split computation services require low latency to maintain an acceptable gaming experience. As illustrated, cloud gaming may be implemented using QoS or over the top (OTT) on the 5G network. Moreover, different use cases may have different location and mobility requirements, as illustrated.

Figure 5:
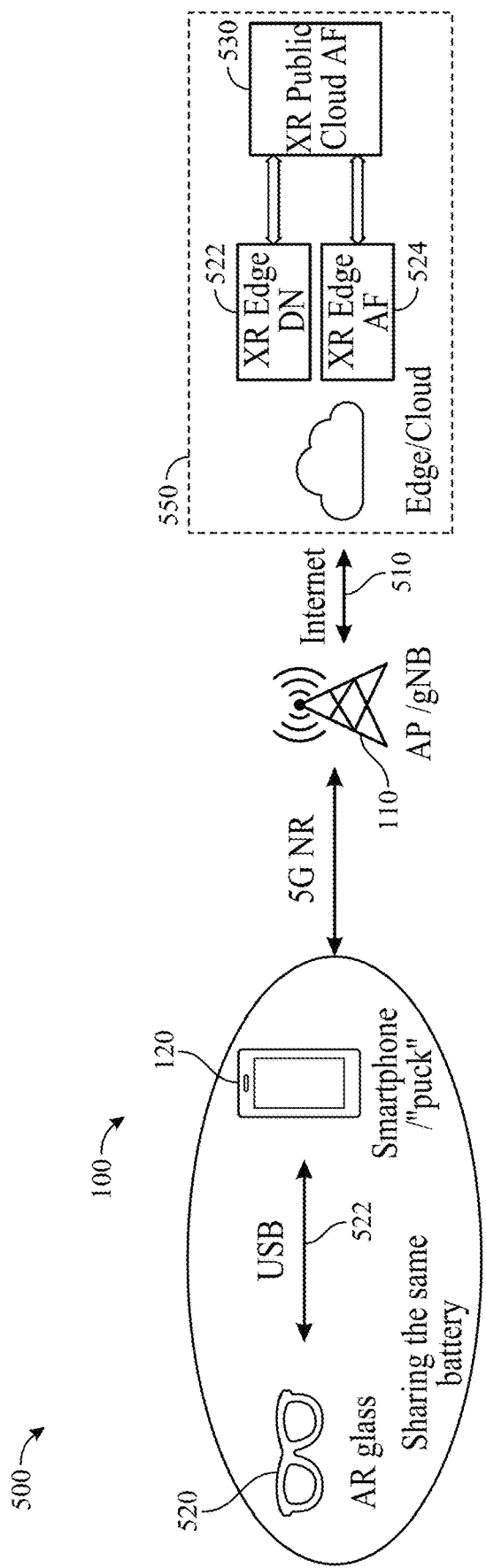
FIG. 5 illustrates a wireless communication system for XR.

According to aspects of the present disclosure, power consumption by AR devices may be a challenge to their usefulness. To be a useful augmentation to smartphones, it is desirable for battery life of AR devices (e.g., an AR glass as shown in FIG. 5) to match the expectation for smartphone battery life (i.e. one full day of use between charges). However, a design constraint for the AR glass is that battery capacity is severely limited, because the proximity of the glass to the user's forehead makes preventing high temperatures (i.e., of the battery) desirable.

In aspects of the present disclosure, an AR glass physically tethered to a smartphone may be a successful design given the technological constraints. Power requirements may still be challenging for the described form-factor, in part due to a potential 2-watt power budget for an AR glass, including power for the system on chip (SoC, e.g., a graphics processing unit (GPU), central processing unit (CPU), and/or memory), a display, a camera, and/or sensors.

FIG. 5 illustrates an exemplary wireless communication system 500 (e.g., a 5G system) for XR. As illustrated, the exemplary wireless communication system 500 may include a UE 120, a radio access network (RAN) 100 including a BS 110, and the Internet 510. In certain aspects, the UE 120 may be associated with or tethered to an AR glass 520 via, for example, a universal serial bus (USB) interface 522, for VR or AR applications. As illustrated, the 5G system 502 may communicate with an edge cloud server 550, which may include logic entities such as an XR edge data network (DN) 522 and an XR edge application function 524. An edge cloud server generally refers to a cloud server located closer to the UE, allowing communication of data with lower latency for various applications as described herein. For example, CN to XR edge server latency may be negligible as compared to the 5G system latency. The edge cloud server 550 may be associated with an XR public cloud AF 530, as illustrated.

According to aspects of the present disclosure, XR downlink traffic may be H.264 and/or H.265 encoded video. This video may be quasi-periodic, with a burst for every frame and thus a burst rate in bursts per second equal to the frame rate of the video in frames per second (fps). Alternatively, this video may be quasi-periodic, with two possibly staggered "eye-buffers" per frame and thus a burst rate in bursts per second equal to 2 times the frame rate in fps.

In aspects of the present disclosure, frames can be split into multiple files, with each file processed separately.

According to aspects of the present disclosure, files of each frame can be intra-coded (i.e., I frames), predicted (i.e., P frames), or bi-directional predicted (i.e., B frames). Generally, the I-frame may include a complete video frame or image, like a JPG or BMP image file. On the contrary, the P-frame may include only the changes in the image from the previous frame. For example, only the portions of the image that have changed since the previous frame are encoded, whereas the unchanging pixels in the frame (e.g., background) are not stored by the encoder, thus saving space. Thus, an I frame is typically larger (e.g., in number of bits) than a P frame. The B-frame saves even more space by using differences between the current frame and both the preceding and following frames to specify its content. Thus, a B frame typically may be smaller than an I frame and a P frame.

In aspects of the present disclosure, uplink transmissions for cloud gaming applications include controller information, while for VR split rendering the uplink transmissions include controller information and user pose information.

According to aspects of the present disclosure, periodicity of uplink transmissions can be higher than downlink (DL) transmissions, to convey latest information from the controller to a server.

In aspects of the present disclosure, AR split computation architectures may include a second flow for AR uplink transmissions, for computer vision (e.g., to determine user pose information), on the edge and/or cloud.

FIG. 6 shows three exemplary transmission timelines 600, 620, and 640, according to aspects of the present disclosure. The exemplary transmission timeline 600 shows XR downlink traffic. As previously mentioned, the downlink traffic may be quasi-periodic, with bursts matching a frame rate of encoded video. The exemplary timeline 600 illustrates how the bursts can vary in size, with an exemplary burst for an I frame at 605 and an exemplary burst for a P frame at 610. The exemplary transmission timeline 620 shows VR split rendering uplink traffic. As previously mentioned, the VR split rendering uplink traffic may include periodic bursts of a similar size 625 that occur more often than the XR downlink traffic bursts. The exemplary transmission timeline 640 shows uplink traffic for an AR split computation architecture. As previously mentioned, the uplink traffic may include both periodic small bursts 645 for controller information and larger bursts 650 at a lower rate for computer vision.

According to aspects of the present disclosure, currently known connected discontinuous reception (C-DRX) techniques do not work well for XR traffic. While C-DRX was introduced in LTE, Release 15 (Rel-15) NR inherits a similar design. The current C-DRX technique was designed for power saving for latency-tolerant traffic (e.g. web-browsing). In the currently C-DRX technique, a "go-to-sleep" behavior is controlled by a DRX inactivity timer and a medium access control control element (MAC-CE) based "DRX command."

In previously known aspects of the present disclosure, a DRX inactivity timer is essentially an implicit "go-to-sleep (GTS)" signaling based on scheduling activity. A dilemma often occurs with DRX inactivity timer configuration, in that if the DRX inactivity timer is configured for too long of a period, then the power saved by using C-DRX is reduced. But, if the DRX inactivity timer is configured for too short of a period, then the UE may go to sleep too soon, which causes the traffic to be deferred to the next "awake" cycle and increases latency.

In aspects of the present disclosure, because XR traffic is both latency-sensitive and quasi-periodic it is desirable to develop C-DRX enhancements.

According to aspects of the present disclosure, an efficiency improvement for a short C-DRX cycle may include an explicit of a GTS command, because for a short DRX cycle, a delay in the UE's going back to sleep could be a huge loss for power saving. Usage of an explicit indication may be superior to implicit signaling based on a DRX inactivity timer. However, a MAC-CE based DRX command has a 3 millisecond delay, which is too high a delay for XR applications.

According to aspects of the present disclosure, it may be beneficial to align beginning of a DRX cycle and a starting offset for the DRX cycle to traffic burst periodicity. However, this type of alignment is not supported in the currently known NR techniques.

In aspects of the present disclosure, cross-slot scheduling (i.e., using a control channel in a current slot to schedule transmissions in a later slot(s)) may facilitate an enhanced microsleep technique. In cross-slot scheduling, a BS (e.g., a gNB) guarantees to a UE that each data transmission assignment is cross-slot scheduled, so that DL control channel processing by the UE would not be in the critical path for a microsleep decision. That is, with cross-slot scheduling, a UE can receive a control channel at a beginning of a slot and immediately go to sleep for the remainder of the slot, as the UE is guaranteed that the control channel does not schedule any data transmissions in the same slot. (K0=1 illustrated)

According to aspects of the present disclosure, cross-slot scheduling may be especially important for higher subcarrier spacing (SCS) techniques, because with higher SCS slot durations become shorter, while the fixed SW and/or HW latency for DL control channel processing reduces the portion of each slot feasible for microsleep, hurting power saving.

In previously known aspects of the present disclosure, cross-slot scheduling is supported in Rel-15 and enhanced in Release 16 (Rel-16). In Rel-15, K0 (i.e., control-channel-to-data-channel delay for PDSCH) values, which can be indicated in scheduling DCI, can be RRC-configured in a time domain resource allocation (TDRA) table. A gNB can ensure that all configured K0 values are non-zero. A UE can then find the minimum of all K0 values and check that the minimum K0 is non-zero, and if so, the UE can execute extended microsleep. In Rel-16, an explicit threshold for a minimum K0 can be configured. The above discussion can also be applied to K2 (i.e., control-channel-to-data-channel delay for PUSCH) in a similar manner. That is, in Rel-15, K2 (i.e., control-channel-to-data-channel delay for PUSCH) values, which can be indicated in scheduling DCI, can be RRC-configured in a time domain resource allocation (TDRA) table. A gNB can ensure that all configured K2 values are greater than some minimum non-zero value. A UE can then find the minimum of all K2 values and check that it is greater than some minimum non-zero value to facilitate power saving. In Rel-16, an explicit threshold for a minimum K2 can be configured.

Figure 7:
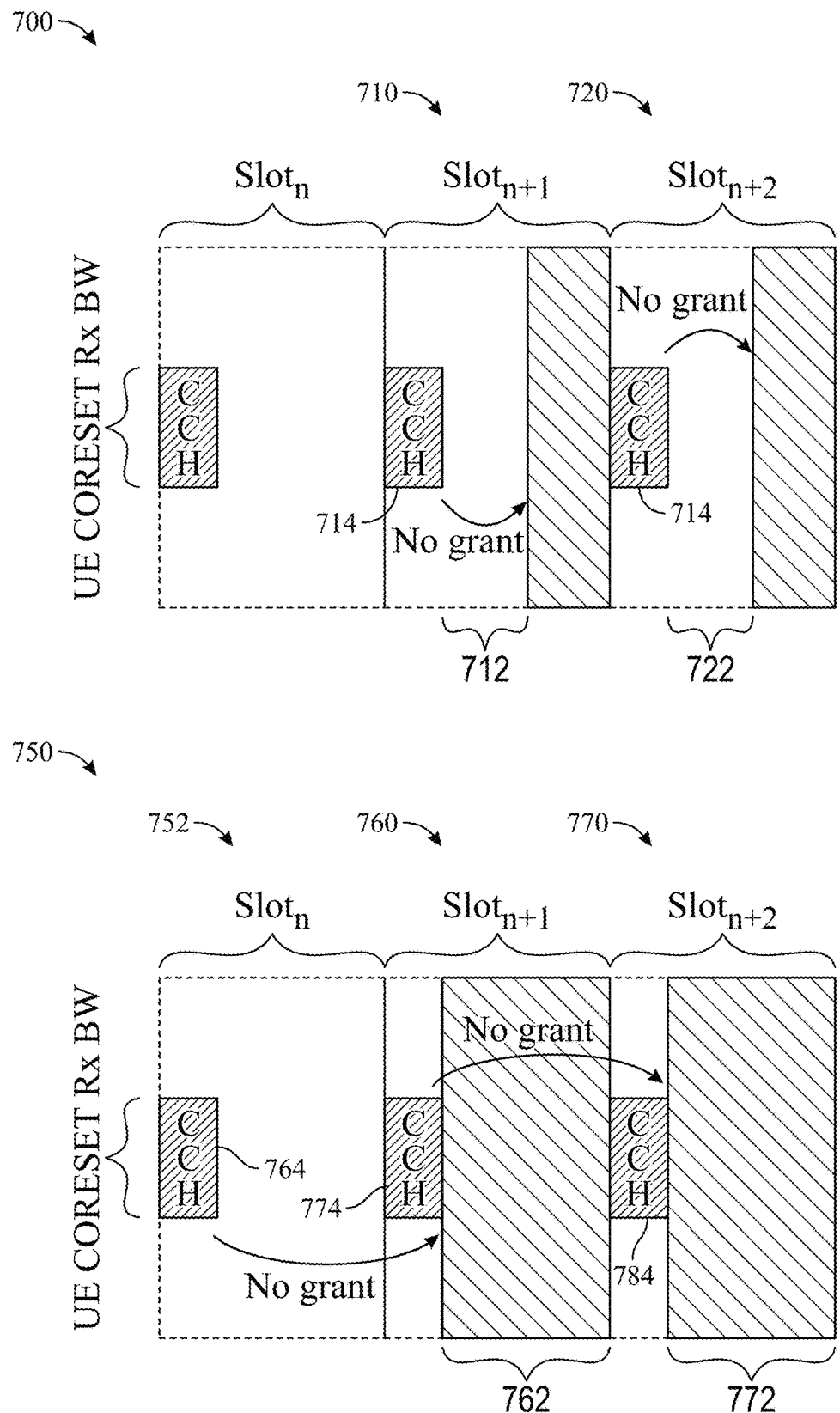
FIG. 7 shows two exemplary transmission timelines showing a UE performing microsleep, in accordance with certain aspects of the present disclosure.

FIG. 7 shows two exemplary transmission timelines 700 and 750 showing a UE performing microsleep, in accordance with aspects of the present disclosure. In the exemplary transmission timeline 700, cross-slot scheduling is not used. Thus, during slots 710 and 720, the UE continues receiving for portions 712 and 722 of the slots, because the UE cannot start microsleep until the UE has decoded the corresponding control channels 714 and 724. Cross-slot scheduling is used in the exemplary transmission timeline 750. Thus, during slots 760 and 770, the UE microsleeps for the longer periods 762 and 772, because the corresponding control channels 764 and 774 were in earlier slots 752 and 760 and the UE had already decoded those control channels, which informed the UE that there were no grants for the UE during the periods 762 and 772.

According to aspects of the present disclosure, using a minimum control-channel-to-data-channel delay of 1 slot (e.g., minimum K0=1) for unicast PDSCH scheduling may result in slightly increased latency during traffic bursts, but as shown above with reference to FIG. 7, enables power savings due to longer microsleep times.

In aspects of the present disclosure, with a minimum control-channel-to-data-channel delay of 1 slot, a UE still performs PDCCH monitoring in each slot during periods between traffic bursts. Thus, it is desirable to develop more improvements for extended reality operations. The parameters K0 and K2 may be referred to as minimum scheduling offsets for the PDSCH and PUSCH, respectively. K0 and K2 may provide the minimum allowed delay between receiving a scheduling grant or other control signaling on a control channel (e.g., PDCCH) and communicating on a data channel (e.g., PDSCH or PUSCH). In aspects, K0 and K2 may be indicated in terms of slots or any other time-domain resource unit.

Example Bandwidth Part Adaptation for Extended Reality

As indicated above, one or more aspects of the present disclosure provide for bandwidth part adaptation for services with differing traffic rates, such as XR traffic and voice/video traffic. For example, various aspects of the disclosure describe BWP switching for dynamic adaptation to changes in traffic over time, PDCCH monitoring periodicity techniques for XR or other low latency and/or high reliability traffic, and cross-slot scheduling adaptation for XR. In aspects of the present disclosure, BWP adaptation may provide a framework for power saving advances for low latency and/or high reliability traffic such as XR or remote control applications, with other techniques utilized with the BWP adaptation.

According to aspects of the present disclosure, PDCCH monitoring periodicity may be part of BWP configuration. That is, each BWP may include a configuration of periodicity for monitoring of PDCCHs in that BWP.

In aspects of the present disclosure, timing parameters (e.g., K0, K1, and K2) may also be part of a BWP configuration.

According to aspects of the present disclosure, a semi-static configuration of the set of values K0, K1, and K2 for a UE can be BWP-specific.

In aspects of the present disclosure, a BS (e.g., a gNB) may decide and signal transitions between BWPs for a UE based on traffic arrivals (e.g., traffic bursts for XR operations) for the UE.

According to aspects of the present disclosure, signaling transitions (e.g., by a BS) between BWPs for a UE may be used in both sub-6 GHz (Sub6) and millimeter-wave (mmW) frequency bands.

Figure 8:
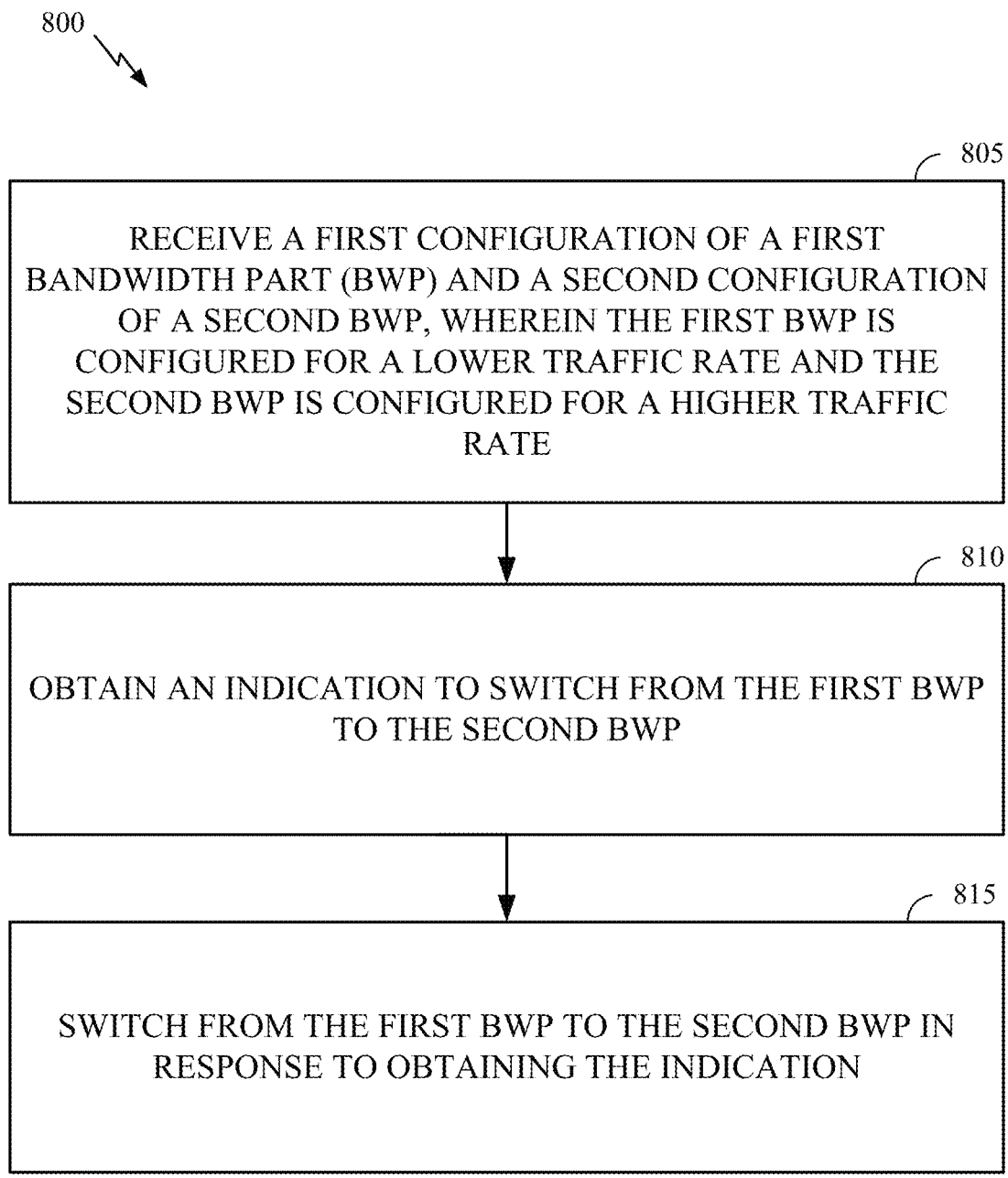
FIG. 8 is a flow diagram illustrating example operations for wireless communication performed by a user equipment (UE), in accordance with certain aspects of the present disclosure.

FIG. 8 is a flow diagram illustrating example operations 800 for wireless communication, in accordance with certain aspects of the present disclosure. The operations 800 may be performed, for example, by a user equipment (UE) (e.g., UE 120 in the wireless communication network 100). Operations 800 may be implemented as software components that are executed and run on one or more processors (e.g., controller/processor 1380 of FIG. 13). Further, the transmission and reception of signals by the UE in operations 800 may be enabled, for example, by one or more antennas (e.g., antennas 1352 of FIG. 13). In certain aspects, the transmission and/or reception of signals by the UE may be implemented via a bus interface of one or more processors (e.g., controller/processor 1380) obtaining and/or outputting signals.

The operations 800 may begin, at block 805, where the UE may receive a first configuration of a first bandwidth part (BWP) and a second configuration of a second BWP, where the first BWP is configured for a lower traffic rate and the second BWP is configured for a higher traffic rate. For example, the first BWP may be configured with a monitoring period for downlink control channels that is less frequent than another monitoring period configured for the second BWP. In other words, the UE may monitor for downlink control messaging more frequently on the second BWP than on the first BWP. The difference in configurations between the first BWP and second BWP may enable power savings when the UE switches between services with the lower traffic rate (e.g., eMBB services such as email, chat, file sharing, video, social media, etc.) and other services with the higher traffic rate (e.g., XR services). The differing traffic rates between the first and second configurations may be indicative of the different or separate services for which the BWPs are configured. In aspects, the first and second BWPs may be configured for different reliabilities (e.g., a lower and higher PER), different latencies (e.g., a lower and higher PDB), or other quality of service parameters associated with the different or separate services. That is, the first BWP may be configured for a first service (e.g., voice or video eMBB traffic), and the second BWP may be configured for a second service (e.g., XR or remote control applications). For example, certain QoS rules may be associated with the first BWP and the second BWP, such that a first set of QoS rules may be associated with the first BWP to facilitate the first service, which may be for lower power consumption than the second service, and a second set of QoS rules may be associated with the second BWP to facilitate the second service. In certain aspects, the first BWP may be configured for lower power consumption than the second BWP, such as the first BWP being configured with shorter monitoring occasions, less frequent monitoring occasions, smaller bandwidth, and/or fewer antennas than the second BWP.

The operations 800 proceed to block 810 where the UE may obtain an indication to switch from the first BWP to the second BWP. For example, the UE may receive a command from a base station, such as a base station, to switch from the first BWP to the second BWP, as further described herein.

The operations 800 proceed to block 815 where the UE may switch from the first BWP to the second BWP in response to obtaining the indication. After switching, the UE may communicate with a base station via the second BWP. For example, the UE may receive XR traffic from the base station via the second BWP, for example, as described herein with respect to FIG. 6. In certain cases, the UE may transmit XR traffic to the base station via the second BWP, for example, as described herein with respect to FIG. 6.

According to aspects of the present disclosure, the first configuration of block 805 may include a first minimum control-channel-to-data-channel delay (e.g., a specific value for K0 and/or K2) for the first BWP, the second configuration of block 805 may include a second minimum control-channel-to-data-channel delay for the second BWP, and the second minimum control-channel-to-data-channel delay may be less than the first minimum control-channel-to-data-channel delay. For example, the second minimum control-channel-to-data-channel delay may be configured to zero slots (facilitating same slot scheduling), and the first minimum control-channel-to-data-channel delay may be configured to one or more slots.

In aspects of the present disclosure, the first configuration of block 805 may include a first periodicity for monitoring physical downlink control channels (PDCCHs) on the first BWP, the second configuration may include a second periodicity for monitoring PDCCHs on the second BWP, and the second periodicity may be less than the first periodicity. In other words, the second periodicity may provide more frequent monitoring windows than the first periodicity. Expressed another way, the second periodicity may provide a shorter DRX cycle than the DRX cycle of the first periodicity. For example, the second periodicity may provide for PDCCH monitoring in at least every slot, and the first periodicity may provide for PDCCH monitoring in every other slot.

According to aspects of the present disclosure, the first configuration of block 805 may include a first bandwidth of the first BWP, the second configuration of block 805 may include a second bandwidth of the second BWP, and the second bandwidth may be greater than the first bandwidth. The size of the bandwidth may be in terms of frequency-domain resource units, such as a physical resource block (PRBs). As an example, the second bandwidth may be assigned more PRBs than the first bandwidth.

In aspects of the present disclosure, the first configuration of block 805 may support a first number of receive antennas for the first BWP, the second configuration of block 805 may support a second number of receive antennas for the second BWP, and the second number of receive antennas may be greater than the first number of receive antennas.

Those of skill in the art will understand that the parameters described herein with respect to the first and second configurations are exemplary only. Additional parameters or categories of parameters may be used in addition to or instead of those described, such as the first configuration and second configuration having different sub carrier spacings, different frequency locations, and/or different frequency bands (e.g., sub-6 GHz and mmW bands).

In aspects, the first and second configurations may be configurations associated with a particular BWP. For example, a downlink or uplink BWP may include a BWP identifier, a set of BWP parameters (e.g., frequency location, bandwidth size, and/or subcarrier spacing), and a PDSCH or PUSCH configuration, where the PDSCH or PUSCH configuration may provide various channel specific parameters, such as a TDRA table indicating potential values for K0 or K2.

According to aspects of the present disclosure, the indication of block 810 may include a command to switch from the first BWP received by the UE. With respect to the operations 800, the UE may receive, from a base station, the command indicating to switch from the first BWP to the second BWP and perform the switch at block 815 in response to the command.

In aspects of the present disclosure, the indication of block 810 may include a trigger detected in a physical (PHY) layer of a transceiver in the UE, wherein the trigger is sent by at least one of a medium access control (MAC) layer, radio link control (RLC) layer, or packet data convergence protocol (PDCP) layer of a protocol stack in a transceiver in a base station (BS). When one or combinations of upper layers (e.g. MAC, RLC or PDCP layer) in a protocol stack at a base station is expecting or preparing for a burst of traffic at the higher traffic rate, the upper layer(s) can directly signal to the physical layer at the base station to trigger switching to the second BWP, before the data packet actually arrives at the physical layer. For example, the UE may receive, from a base station, the indication to switch to the second BWP in response to the preemptive protocol stack signaling at the base station. In other words, the base station may implement preemptive protocol stack signaling that facilitates triggering a switch to the second BWP at the UE.

According to aspects of the present disclosure, the indication of block 810 may include an expiration of a periodic timer for switching to the second BWP. For example, the UE may be configured with a periodic timer for switching from the first BWP to the second BWP, and in certain cases, subsequently switching from the second BWP to the first BWP, for example, as described herein with respect to FIG. 11.

In aspects of the present disclosure, the indication of block 810 may include at least one of a buffer status report (BSR) or a scheduling request (SR) generated by the UE. With respect to the operations 800, the UE may transmit, to a base station, a BSR or a SR indicating that the UE has the higher rate traffic to send to the base station, and in response to sending the BSR or SR to the base station, the UE may preemptively switch to the second BWP, at block 510, before receiving an UL grant from the base station to facilitate low latency transmission of the higher rate traffic to the base station.

According to aspects of the present disclosure, the indication of block 810 may include an uplink (UL) grant received by the UE. For example, the UE may receive an UL grant from the base station, and in response to the UL grant, the UE may switch to the second BWP.

In certain aspects, the UE may obtain another indication to switch from the second BWP to the first BWP, for example, as described herein with respect to the indication to switch from the first BWP to the second BWP. The UE may switch from the second BWP to the first BWP in response to obtaining the other indication. Switching between the first BWP and the second BWP may enable power savings at the UE. As an example, the UE may monitor the PDCCH less frequently with the first BWP than the second BWP, which may enable the UE to consume less power when the first BWP is active compared to when the second BWP is active. In certain cases, the UE may communicate with fewer antennas when the first BWP is active compared to when the second BWP is active, which may enable the UE to consume less power when the first BWP is active compared to when the second BWP is active.

In aspects of the present disclosure, a UE performing the operations 800 may receive a third configuration of a third BWP, wherein the second BWP is configured for P frames and the third BWP is configured for the higher traffic rate for I frames; receive another indication that a P frame is to be transmitted to the UE; and determine to switch to the second BWP, based on the other indication.

Figure 9:
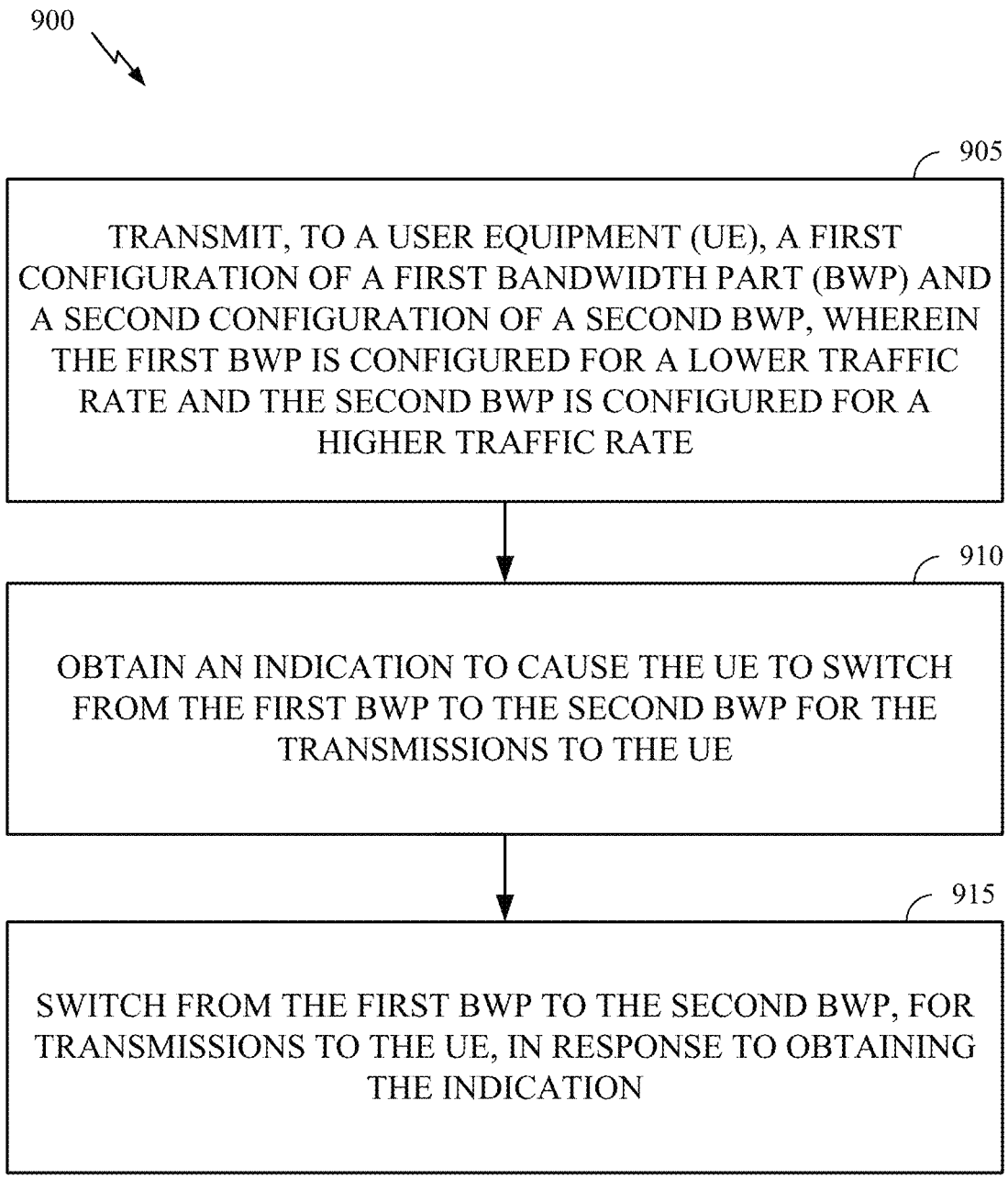
FIG. 9 is a flow diagram illustrating example operations for wireless communication performed by a base station (BS), in accordance with certain aspects of the present disclosure.

FIG. 9 is a flow diagram illustrating example operations 900 for wireless communication, in accordance with certain aspects of the present disclosure. The operations 900 may be performed, for example, by a BS (e.g., such as a BS 110 in the wireless communication network 100). The operations 900 may be complimentary to the operations 800 performed by a UE. Operations 900 may be implemented as software components that are executed and run on one or more processors (e.g., controller/processor 1340 of FIG. 13). Further, the transmission and reception of signals by the BS in operations 900 may be enabled, for example, by one or more antennas (e.g., antennas 1334 of FIG. 13). In certain aspects, the transmission and/or reception of signals by the BS may be implemented via a bus interface of one or more processors (e.g., controller/processor 1340) obtaining and/or outputting signals.

The operations 900 may begin, at block 905, where the BS may transmit, to a UE, a first configuration of a first BWP and a second configuration of a second BWP, wherein the first BWP is configured for a lower traffic rate and the second BWP is configured for a higher traffic rate.

At block 910, the operations 900 may proceed where the BS may obtain an indication to cause the UE to switch from the first BWP to the second BWP for the transmissions to the UE.

At block 915, the operations 900 may proceed where the BS may switch from the first BWP to the second BWP, for communications with the UE, in response to obtaining the indication. After switching from the first BWP to the second BWP, the BS may communicate with the UE via the second BWP. For example, the BS may transmit XR traffic to the UE via the second BWP, for example, as described herein with respect to FIG. 6. In certain cases, the BS may receive XR traffic from the UE via the second BWP, for example, as described herein with respect to FIG. 6.

According to aspects of the present disclosure, the first configuration of block 905 may include a first minimum control-channel-to-data-channel delay (e.g., a specific value for K0 and/or K2) for the first BWP, the second configuration of block 905 may include a second minimum control-channel-to-data-channel delay for the second BWP, and the second minimum control-channel-to-data-channel delay may be less than the first minimum control-channel-to-data-channel delay.

In aspects of the present disclosure, the first configuration of block 905 may include a first periodicity for monitoring physical downlink control channels (PDCCHs) on the first BWP, the second configuration of block 905 may include a second periodicity for monitoring PDCCHs on the second BWP, and the second periodicity may be less than the first periodicity, for example, as described herein with respect to the operations 800.

According to aspects of the present disclosure, the first configuration of block 905 may include a first bandwidth of the first BWP, the second configuration of block 905 may include a second bandwidth of the second BWP, and the second bandwidth may be greater than the first bandwidth, for example, as described herein with respect to the operations 800.

In aspects of the present disclosure, the first configuration of block 905 may support (e.g., by indicating a rank indicator supporting a number of receive antennas) a first number of receive antennas for the first BWP, the second configuration of block 905 may support a second number of receive antennas for the second BWP, and the second number of receive antennas may be greater than the first number of receive antennas, for example, as described herein with respect to the operations 800.

According to aspects of the present disclosure, the indication of block 910 may include an arrival of traffic for the UE at a physical layer of a protocol stack in a transceiver in the BS, for example, as described herein with respect to the operations 800. In aspects, the base station may detect the arrival of certain traffic (such as traffic with higher reliability (e.g., PER), lower latency (e.g., PDB), and/or the higher traffic rate (e.g., data rate or bit rate) than other traffic scheduled on the first BWP) at the physical layer. The base station may transmit, to the UE, a command indicating to switch from the first BWP to the second BWP in response to the detect traffic and perform the switch at block 915 in response to the command.

In aspects of the present disclosure, the indication of block 910 may include at least one of a MAC layer, a RLC layer, or a PDCP layer of a protocol stack in a transceiver in the BS sending a trigger to the UE, wherein the trigger is sent based on another indication to prepare for a burst of traffic, for example, as described herein with respect to the operations 800. When one or combinations of upper layers (e.g. MAC, RLC or PDCP layer) in a protocol stack at the base station is expecting or preparing for a burst of traffic at the higher traffic rate (higher reliability or lower latency than configured for the first BWP), the upper layer(s) can directly signal to the physical layer at the base station to trigger switching to the second BWP before the data packet actually arrives at the physical layer.

In certain aspects, the preemptive triggering may be based at least in part on predicting the traffic burst arrival at the UE. As an example, the base station may determine the periodicity of the burst pattern, such as, when XR traffic will periodically arrive from an application server for downlink transmission to the UE. The base station may preemptively signal to the UE to switch to the second BWP in anticipation of receiving downlink XR traffic from the application server based on the determined burst pattern.

According to aspects of the present disclosure, the indication of block 910 may include expiration of a periodic timer for switching to the second BWP, for example, as described herein with respect to the operations 800. As an example, the base station may be configured with a periodic timer for switching from the first BWP to the second BWP, and in certain cases, subsequently switching from the second BWP to the first BWP, for example, as described herein with respect to FIG. 11.

In aspects of the present disclosure, the indication of block 910 may include at least one of a buffer status report (BSR) or a scheduling request (SR) generated by the UE, for example, as described herein with respect to the operations 800.

According to aspects of the present disclosure, the indication of block 910 may include an uplink (UL) grant transmitted to the UE by the BS, for example, as described herein with respect to the operations 800.

In certain aspects, the base station may obtain another indication to switch from the second BWP to the first BWP, for example, as described herein with respect to the indication to switch from the first BWP to the second BWP. The base station may switch from the second BWP to the first BWP in response to obtaining the other indication. Switching between the first BWP and the second BWP for communications between the base station and UE may enable power savings at the UE.

In aspects of the present disclosure, a BS performing the operations 900 may transmit a third configuration of a third BWP, wherein the second BWP is configured for P frames and the third BWP is configured for the higher traffic rate for I frames; obtain another indication that a P frame is to be transmitted to the UE; and determine to switch to the second BWP, based on the other indication.

Figure 10:
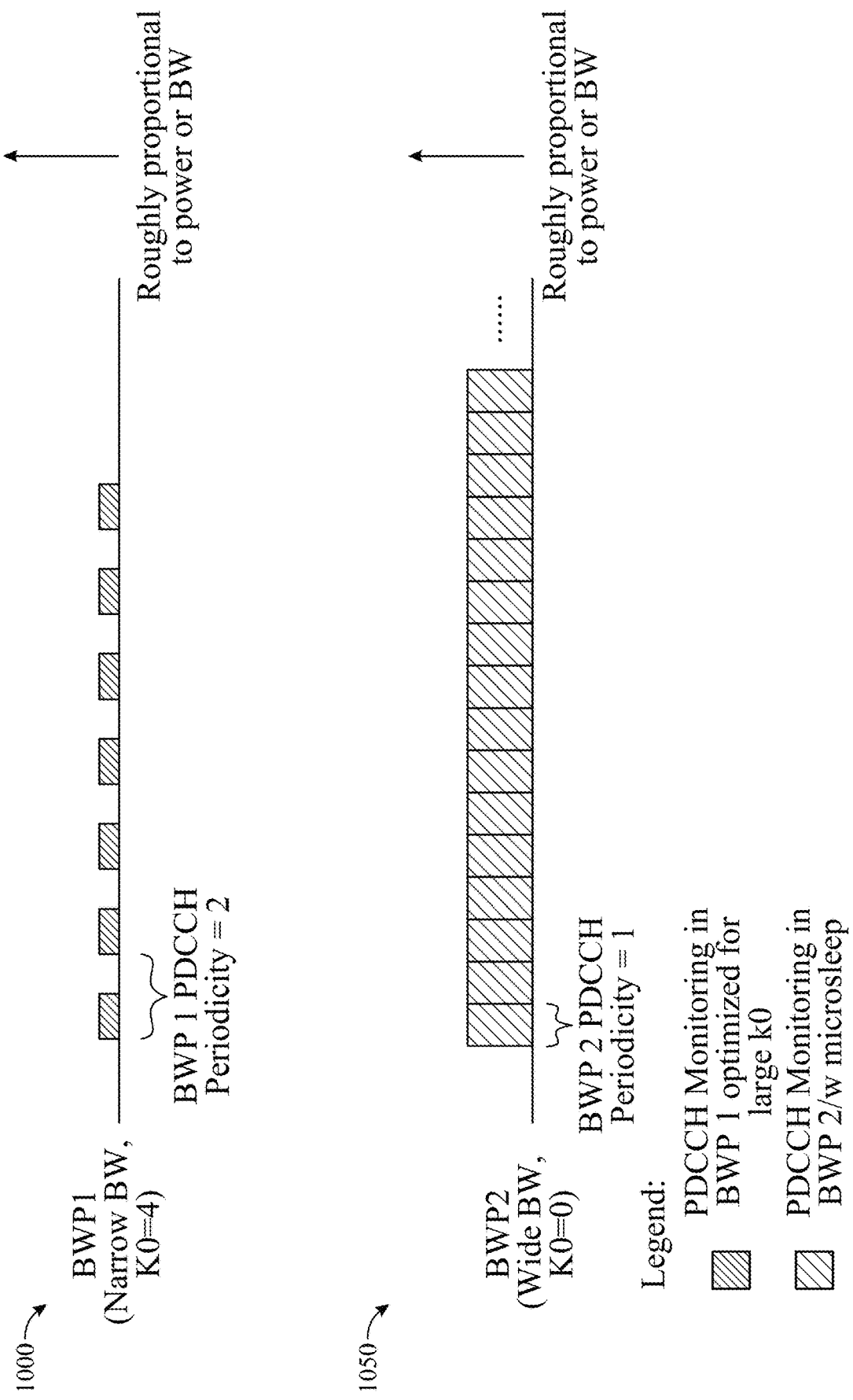
FIG. 10 shows exemplary reception timelines for two bandwidth parts (BWPs), in accordance with aspects of the present disclosure.

FIG. 10 shows exemplary reception timelines 1000 and 1050 for two BWPs: BWP1 and BWP2, in accordance with aspects of the present disclosure. In the exemplary reception timeline 1000, reception operations are shown of a UE for BWP1, which is configured for little traffic and lower traffic rates. As described above, that configuration may include a larger non-zero minimum K0 (e.g., 1 or 4 slots), a sparser PDCCH monitoring periodicity (e.g., 2 slots), a narrower bandwidth for the BWP, and support for fewer receive antennas than the corresponding configuration for BWP2. In the exemplary reception timeline 1050, reception operations are shown of a UE for BWP2 configuration, which is configured for traffic bursts. As described above, that configuration may include a smaller minimum K0 (e.g., 0), per-slot PDCCH monitoring (e.g., 1 slot PDCCH monitoring periodicity) a wider bandwidth for the BWP, and support for a greater number of receive antennas than the corresponding configuration for BWP1.

Figure 11:
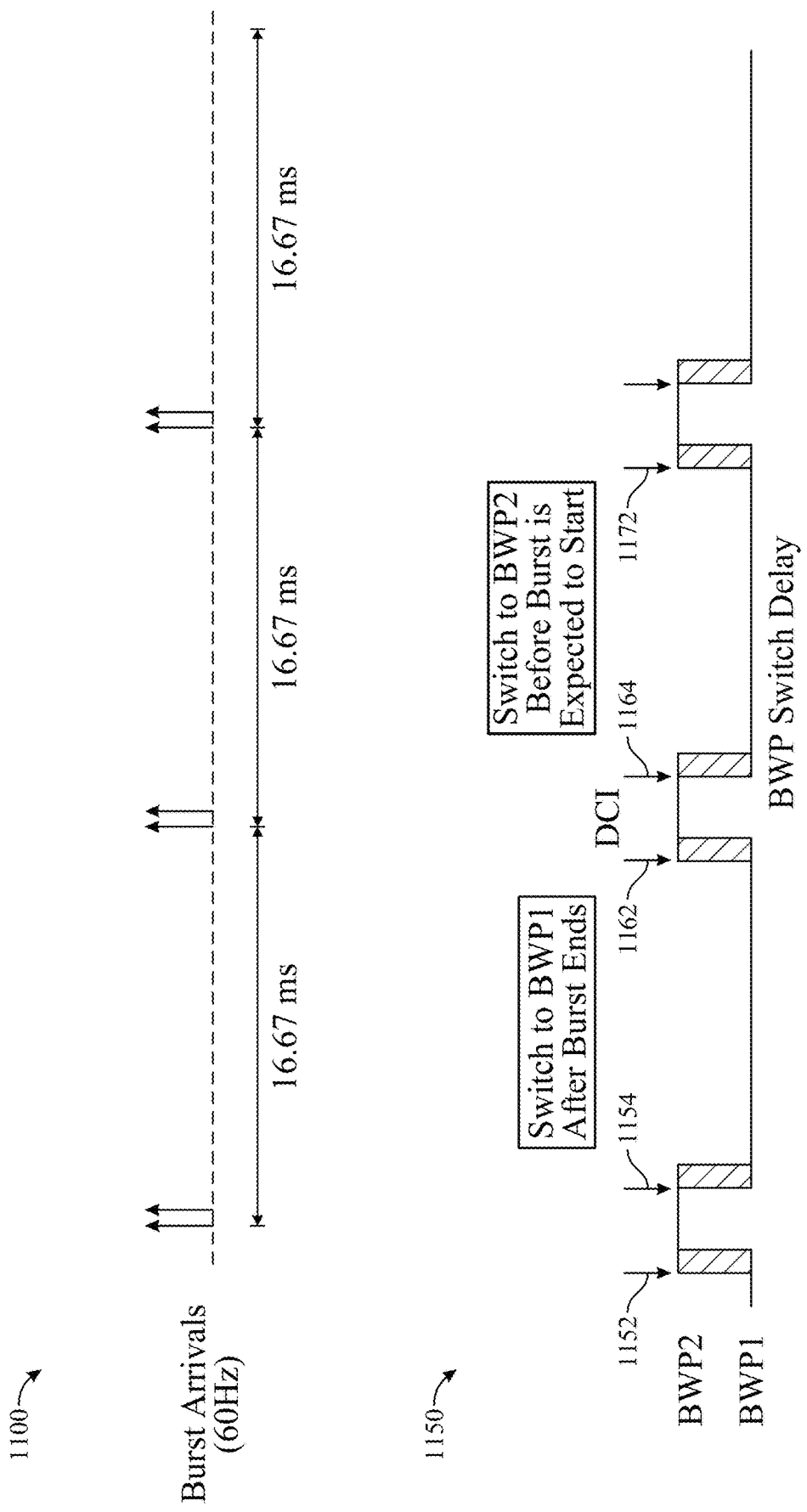
FIG. 11 shows an exemplary transmission timeline of a BS and an exemplary corresponding reception timeline of a UE, according to aspects of the present disclosure.

FIG. 11 shows an exemplary transmission timeline 1100 of a BS (e.g., a gNB) and an exemplary corresponding reception timeline 1150 of a UE, according to aspects of the present disclosure. At 1152 and 1162, the BS provides explicit signaling to the UE, and the explicit signaling may indicate for the UE to switch between operating on BWP1 for power saving and operating on BWP2 for a traffic burst. In aspects of the present disclosure, that explicit signaling can be either a DL scheduling DCI or an UL scheduling DCI. According to some aspects of the present disclosure, the UE may switch to BWP1 in response to the expiration of a BWP inactivity timer (e.g., for BWP2) instead of explicit DCI, as shown at 1154. At 1164, the BS provides explicit signaling for the UE to switch between operating on BWP2 for receiving the traffic burst and operating on BWP1 for power saving. In some such aspects, a BS (e.g., a gNB) may configure BWP1 as a "default BWP" for the UE and configure a BWP inactivity timer to a small value, but not so small that the BWP inactivity timer would expire during the burst (including some gaps within the burst). According to some aspects of the present disclosure, if a BS (e.g., a gNB) can estimate the traffic burst's arrival time, the BS can pre-emptively switch to BWP2 and pre-emptively cause the UE to switch to BWP2 when the burst arrives, as shown at 1172. In such aspects, the active BWP is BWP1 when the BS estimates the arrival of the burst. In aspects of the present disclosure, if switching BWPs is done only when a traffic burst actually arrives, then an extra delay to the traffic may occur (e.g., a BWP switch delay of up to 3 msec).

According to aspects of the present disclosure, switching from a first BWP configured for a lower traffic rate to a second BWP configured for a higher traffic rate may be triggered when traffic arrives at a physical layer of a protocol stack from an application (e.g., an XR application).

In aspects of the present disclosure, when one or a combination of upper layers (e.g. MAC, RLC, or PDCP layer) of a protocol stack is expecting and/or preparing for a burst of traffic, the upper layer(s) may directly signal to the physical (PHY) layer to trigger a switch to a second BWP configured for a higher traffic rate, even before the data packet actually arrives at the physical layer.

According to aspects of the present disclosure, switching from a first BWP configured for a lower traffic rate to a second BWP configured for a higher traffic rate may be triggered based on a traffic burst arrival prediction.

In aspects of the present disclosure, a periodic timer (e.g., other than a DRX timer) may be configured for switching to a second BWP configured for a higher traffic rate periodically. In some aspects of the present disclosure, such a periodic timer may be similar to a BWP inactivity timer, but this periodic timer always loops around and always runs or runs whenever an XR application is active. In such aspects, when the timer expires, the timer triggers a switch to the second BWP unless that BWP is active already.

According to aspects of the present disclosure, a UE or a BS (e.g., a gNB) may use a BSR or SR from the UE as a trigger to switch to a second BWP configured for a higher traffic rate. In some such aspects, the UE or the BS may switch to a third BWP that is optimized for uplink traffic (e.g., when there is no DL traffic).

In aspects of the present disclosure, a UE or a BS (e.g., a gNB) may be triggered to switch to a second BWP configured for a higher traffic rate by an UL grant.

According to aspects of the present disclosure, BWP configuration for supporting traffic bursts (e.g., for XR applications) may be further improved. In some aspects of the present disclosure, XR traffic arrival can be for I frame or P frame. As previously described, an I frame is noticeably larger in size (approximately 3 times) than a P frame, but the two types of frames have similar deadline requirements. In aspects of the present disclosure, Instead of configuring a single BWP to handle a traffic burst, multiple BWPs may be configured with each BWP tailored to a different level of traffic. For example, a first BWP may be configured for traffic between bursts, while a second BWP is configured to handle a traffic burst containing an I frame and a third BWP is configured to handle a traffic burst containing P frame. In some such aspects, the peak throughput supported by the second BWP may be higher than the peak throughput supported by the third BWP, and the expected average power consumption for the third BWP may be lower than the expected average power consumption for the second BWP. In such aspects, a UE may be switched to either the second BWP or the third BWP for a traffic burst depending on whether the traffic burst conveys an I frame or a P frame.

Figure 12:
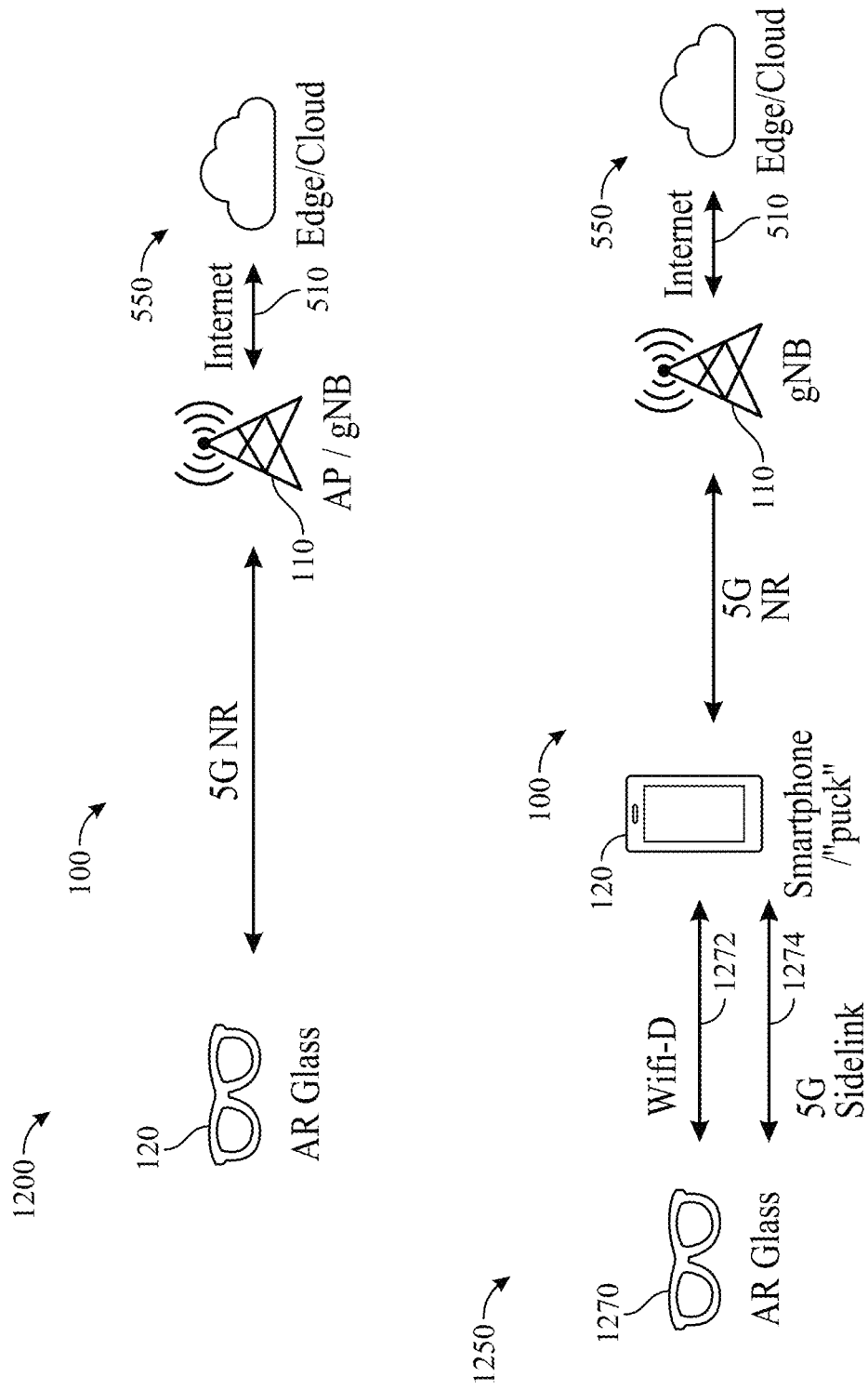
FIG. 12 illustrates exemplary wireless communication for XR.

FIG. 12 illustrates exemplary wireless communication systems 1200 (e.g., a 5G system) and 1250 for XR. The exemplary wireless communication systems include many of the same components illustrated in FIG. 5, which will not be further described. As illustrated, the exemplary wireless communication system 1200 includes an AR glass that includes a 5G transceiver such that the AR glass is effectively a UE. The exemplary wireless communication system 1250, the AR glass 1270 is associated with the UE via a wireless connection, such as a Wi-Fi Direct™ (WiFi-D) connection 1272 and/or a 5G sidelink connection 1274.

Figure 13:
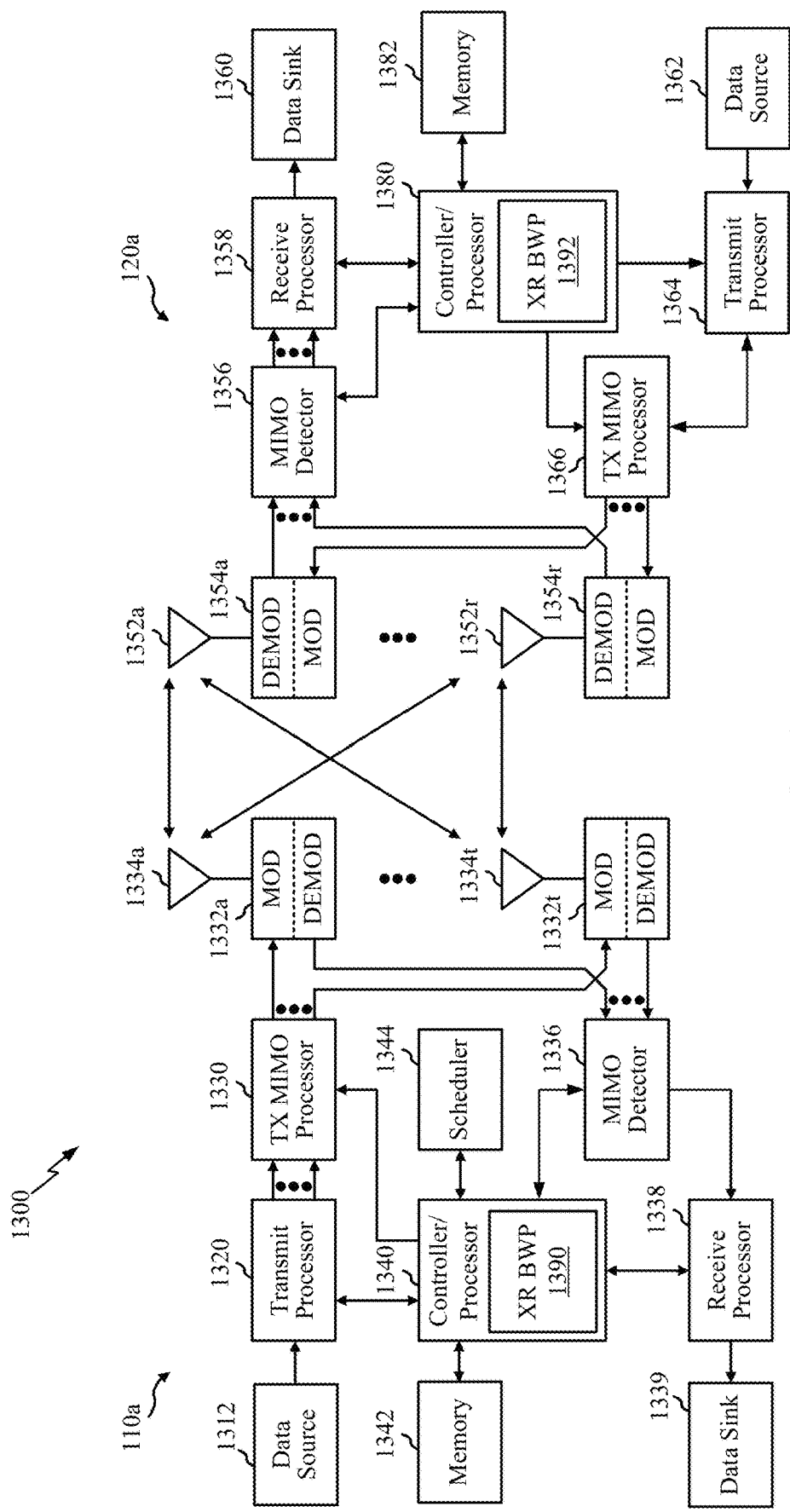
FIG. 13 is a block diagram illustrating an example architecture of a distributed radio access network (RAN), in accordance with certain aspects of the present disclosure.

FIG. 13 illustrates example components 1300 of BS 110a and UE 120a (e.g., in the wireless communication network 100 of FIG. 1), which may be used to implement aspects of the present disclosure. For example, antennas 1352, processors 1366, 1358, 1364, and/or controller/processor 1380 of the UE 120a and/or antennas 1334, processors 1320, 1330, 1338, and/or controller/processor 1340 of the BS 110a may be used to perform the various techniques and methods described herein.

At the BS 110a, a transmit processor 1320 may receive data from a data source 1312 and control information from a controller/processor 1340. The control information may be for the physical broadcast channel (PBCH), physical control format indicator channel (PCFICH), physical hybrid ARQ indicator channel (PHICH), PDCCH, group common PDCCH (GC PDCCH), etc. The data may be for the PDSCH, etc. The processor 1320 may process (e.g., encode and symbol map) the data and control information to obtain data symbols and control symbols, respectively. The transmit processor 1320 may also generate reference symbols, such as for the primary synchronization signal (PSS), secondary synchronization signal (SSS), and cell-specific reference signal (CRS). A transmit (TX) multiple-input multiple-output (MIMO) processor 1330 may perform spatial processing (e.g., precoding) on the data symbols, the control symbols, and/or the reference symbols, if applicable, and may provide output symbol streams to the modulators (MODs) 1332a-1332t. Each modulator 1332 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 1332a-1332t may be transmitted via the antennas 1334a-1334t, respectively.

At the UE 120a, the antennas 1352a-1352r may receive the downlink signals from the BS 110a and may provide received signals to the demodulators (DEMODs) in transceivers 1354a-1354r, respectively. Each demodulator 1354 may condition (e.g., filter, amplify, downconvert, and digitize) a respective received signal to obtain input samples. Each demodulator may further process the input samples (e.g., for OFDM, etc.) to obtain received symbols. A MIMO detector 1356 may obtain received symbols from all the demodulators 1354a-1354r, perform MIMO detection on the received symbols if applicable, and provide detected symbols. A receive processor 1358 may process (e.g., demodulate, deinterleave, and decode) the detected symbols, provide decoded data for the UE 120a to a data sink 1360, and provide decoded control information to a controller/processor 1380.

On the uplink, at UE 120a, a transmit processor 1364 may receive and process data (e.g., for the physical uplink shared channel (PUSCH)) from a data source 1362 and control information (e.g., for the physical uplink control channel (PUCCH) from the controller/processor 1380. The transmit processor 1364 may also generate reference symbols for a reference signal (e.g., for the sounding reference signal (SRS)). The symbols from the transmit processor 1364 may be precoded by a TX MIMO processor 1366 if applicable, further processed by the demodulators in transceivers 1354a-1354r (e.g., for SC-FDM, etc.), and transmitted to the BS 110a. At the BS 110a, the uplink signals from the UE 120a may be received by the antennas 1334, processed by the modulators 1332, detected by a MIMO detector 1336 if applicable, and further processed by a receive processor 1338 to obtain decoded data and control information sent by the UE 120a. The receive processor 1338 may provide the decoded data to a data sink 1339 and the decoded control information to the controller/processor 1340.

The memories 1342 and 1382 may store data and program codes for BS 110a and UE 120a, respectively. A scheduler 1344 may schedule UEs for data transmission on the downlink and/or uplink.

The controllers/processors 1340 and 1380 may direct the operation at the BS 110 and the UE 120, respectively. In some configurations, the user equipment (UE) 120 includes an XR BWP module 1392 configured for receiving a first configuration of a first bandwidth part (BWP) and a second configuration of a second BWP, wherein the first BWP is configured for a lower traffic rate and the second BWP is configured for a higher traffic rate; for obtaining an indication to switch from the first BWP to the second BWP; and for switching from the first BWP to the second BWP in response to obtaining the indication. In some configurations, the BS 110 also includes an XR BWP module 1390 that may be configured for transmitting, to a user equipment (UE), a first configuration of a first bandwidth part (BWP) and a second configuration of a second BWP, wherein the first BWP is configured for a lower traffic rate and the second BWP is configured for a higher traffic rate; for obtaining an indication to cause the UE to switch from the first BWP to the second BWP for the transmissions to the UE; and for switching from the first BWP to the second BWP, for transmissions to the UE, in response to obtaining the indication. The controller/processor 1340 and/or other processors and circuits at the BS 110 may perform or direct the execution of processes for the techniques described herein. The memories 1342 and 1382 may store data and program codes for BS 110 and UE 120, respectively. A scheduler 1344 may schedule UEs for data transmission on the downlink and/or uplink.

Figure 14:
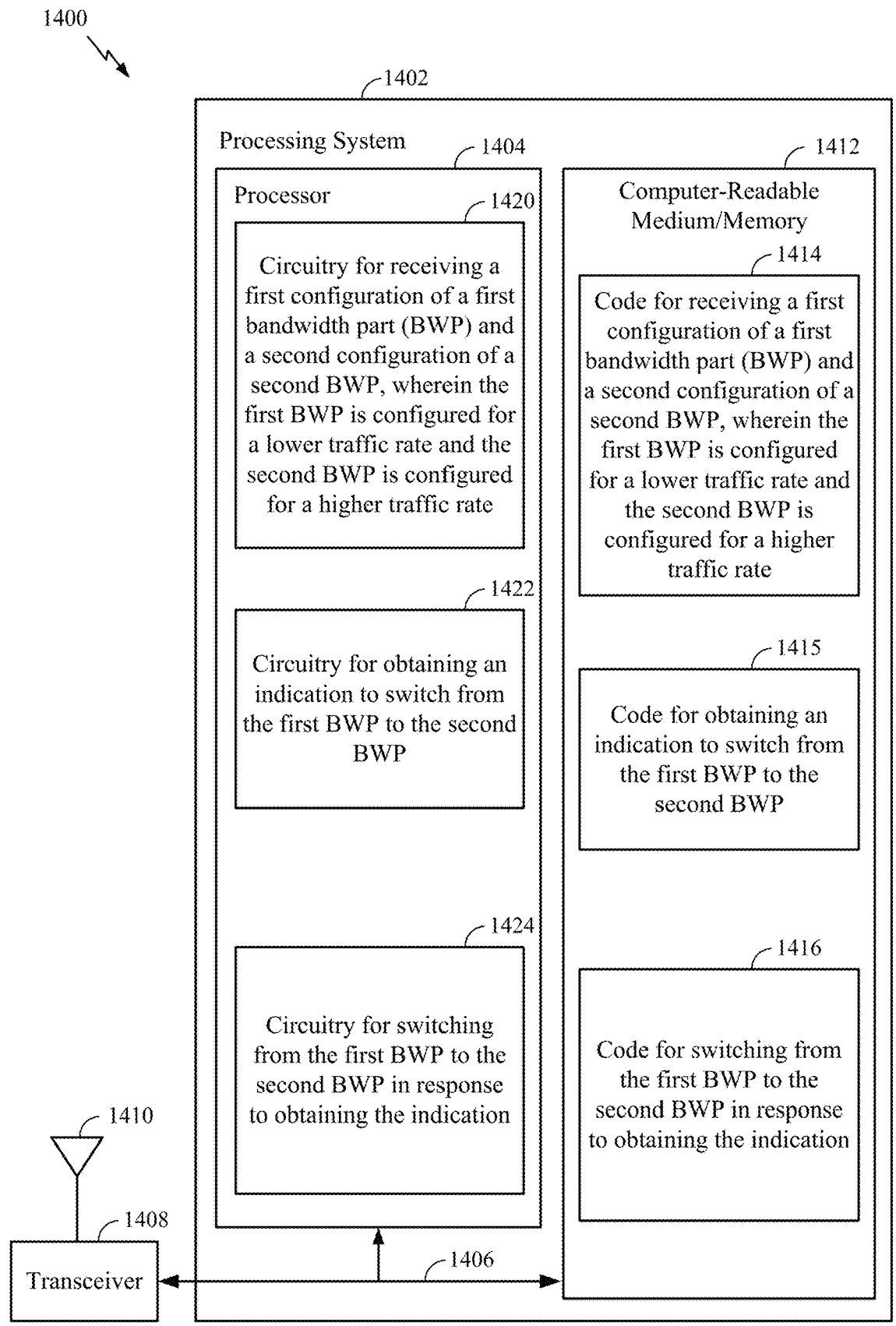
FIG. 14 illustrates a communications device (e.g., a UE) that may include various components configured to perform the operations illustrated in FIG. 8, in accordance with aspects of the present disclosure.

FIG. 14 illustrates a communications device 1400 (e.g., a UE) that may include various components (e.g., corresponding to means-plus-function components) configured to perform operations for the techniques disclosed herein, such as the operations illustrated in FIG. 8. The communications device 1400 includes a processing system 1402 coupled to a transceiver 1408. The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., computer-executable code) that when executed by the processor 1404, cause the processor 1404 to perform the operations illustrated in FIG. 8, or other operations for performing the various techniques discussed herein. In certain aspects, computer-readable medium/memory 1412 stores code for receiving a first configuration of a first bandwidth part (BWP) and a second configuration of a second BWP, wherein the first BWP is configured for a lower traffic rate and the second BWP is configured for a higher traffic rate 1414, code for obtaining an indication to switch from the first BWP to the second BWP 1415, and code for switching from the first BWP to the second BWP in response to obtaining the indication 1416. In certain aspects, the processor 1404 has circuitry configured to implement the code stored in the computer-readable medium/memory 1412. The processor 1404 includes circuitry for receiving a first configuration of a first bandwidth part (BWP) and a second configuration of a second BWP, wherein the first BWP is configured for a lower traffic rate and the second BWP is configured for a higher traffic rate 1420, circuitry for obtaining an indication to cause the UE to switch from the first BWP to the second BWP for the transmissions to the UE 1422, and circuitry for switching from the first BWP to the second BWP in response to obtaining the indication 1424.

Figure 15:
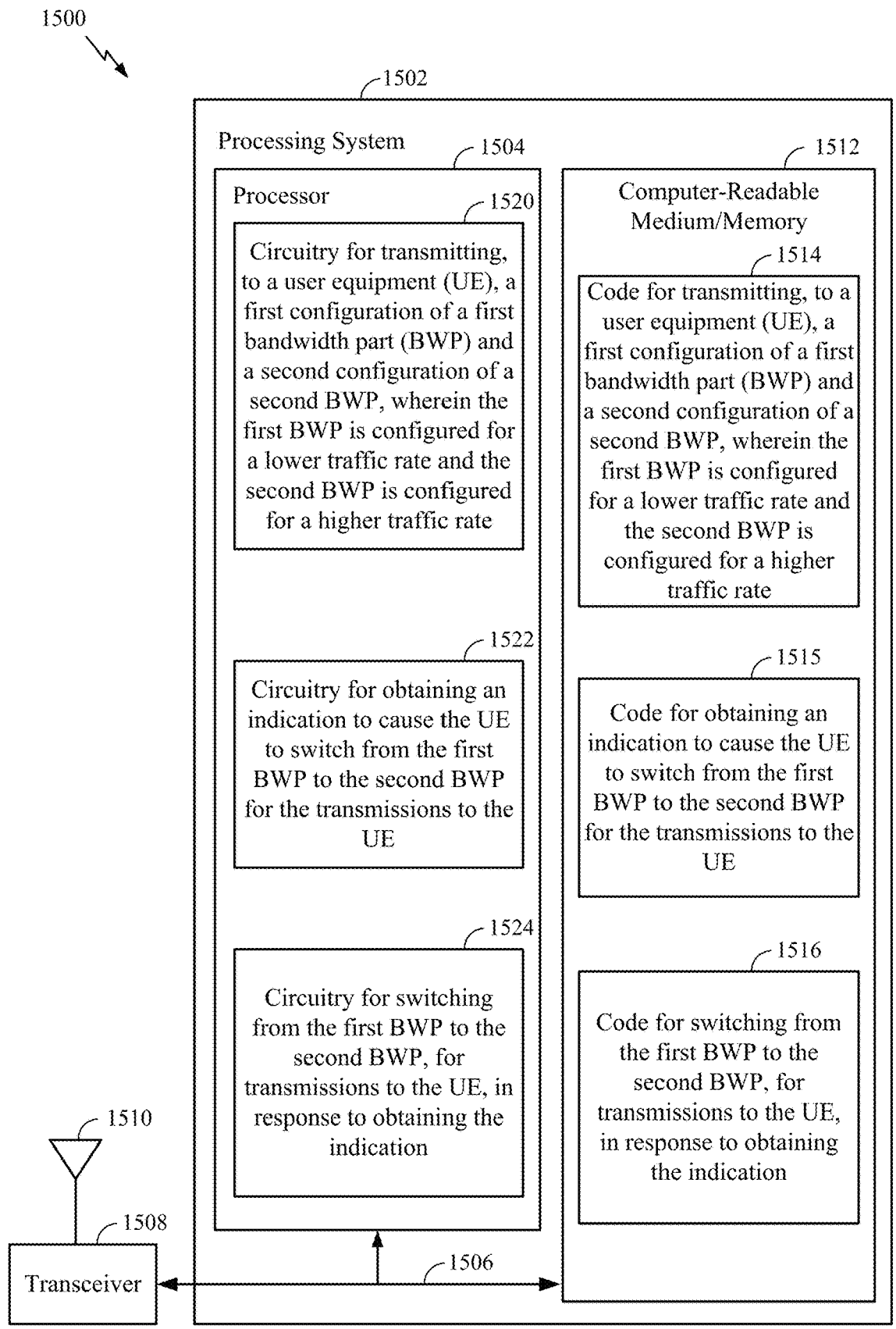
FIG. 15 illustrates a communications device (e.g., a BS) that may include various components configured to perform the operations illustrated in FIG. 9, in accordance with aspects of the present disclosure.

FIG. 15 illustrates a communications device 1500 (e.g., a base station and/or network controller) that may include various components (e.g., corresponding to means-plus-function components) configured to perform operations for the techniques disclosed herein, such as the operations illustrated in FIG. 9. The communications device 1500 includes a processing system 1502 coupled to a transceiver 1508. The transceiver 1508 is configured to transmit and receive signals for the communications device 1500 via an antenna 1510, such as the various signals as described herein. The processing system 1502 may be configured to perform processing functions for the communications device 1500, including processing signals received and/or to be transmitted by the communications device 1500.

The processing system 1502 includes a processor 1504 coupled to a computer-readable medium/memory 1512 via a bus 1506. In certain aspects, the computer-readable medium/memory 1512 is configured to store instructions (e.g., computer-executable code) that when executed by the processor 1504, cause the processor 1504 to perform the operations illustrated in FIG. 9, or other operations for performing the various techniques discussed herein. In certain aspects, computer-readable medium/memory 1512 stores code for transmitting, to a user equipment (UE), a first configuration of a first bandwidth part (BWP) and a second configuration of a second BWP, wherein the first BWP is configured for a lower traffic rate and the second BWP is configured for a higher traffic rate 1514, code for obtaining an indication to switch from the first BWP to the second BWP 1515, and code switching from the first BWP to the second BWP, for transmissions to the UE, in response to obtaining the indication 1516. In certain aspects, the processor 1504 has circuitry configured to implement the code stored in the computer-readable medium/memory 1512. The processor 1504 includes circuitry for transmitting, to a user equipment (UE), a first configuration of a first bandwidth part (BWP) and a second configuration of a second BWP, wherein the first BWP is configured for a lower traffic rate and the second BWP is configured for a higher traffic rate 1520, circuitry for obtaining an indication to cause the UE to switch from the first BWP to the second BWP for the transmissions to the UE 1522, and circuitry for switching from the first BWP to the second BWP, for transmissions to the UE, in response to obtaining the indication 1524.

Example Aspects

In addition to the various aspects described above, specific combinations of aspects are within the scope of the disclosure, some of which are detailed below:

Aspect 1. An apparatus for wireless communications, comprising: a transceiver configured to receive a first configuration of a first bandwidth part (BWP) and a second configuration of a second BWP, wherein the first BWP is configured for a lower traffic rate and the second BWP is configured for a higher traffic rate; a memory; and a processor coupled to the memory, the processor and the memory being configured to obtain an indication to switch from the first BWP to the second BWP; and wherein the transceiver is further configured to switch from the first BWP to the second BWP in response to obtaining the indication.

Aspect 2. The apparatus of Aspect 1, wherein the first configuration includes a first minimum control-channel-to-data-channel delay for the first BWP, wherein the second configuration includes a second minimum control-channel-to-data-channel delay for the second BWP, and wherein the second minimum control-channel-to-data-channel delay is less than the first minimum control-channel-to-data-channel delay.

Aspect 3. The apparatus according to any of Aspects 1 or 2, wherein: the first configuration includes at least one of a first periodicity for monitoring physical downlink control channels (PDCCHs) on the first BWP, a first bandwidth of the first BWP, or support for a first number of receive antennas for the first BWP; the second configuration includes a second periodicity for monitoring PDCCHs on the second BWP, a second bandwidth of the second BWP, or support for a second number of receive antennas for the second BWP; the second periodicity is less than the first periodicity; the second bandwidth is greater than the first bandwidth; and the second number of receive antennas greater than the first number of receive antennas.

Aspect 4. The apparatus according to any of Aspects 1-3, wherein: the transceiver is further configured to receive a command to switch from the first BWP; and the indication comprises the command to switch from the first BWP.

Aspect 5. The apparatus according to any of Aspects 1-4, wherein: the transceiver is further configured to detect a trigger in a physical (PHY) layer, wherein the trigger is sent by at least one of a medium access control (MAC) layer, radio link control (RLC) layer, or packet data convergence protocol (PDCP) layer of a protocol stack in a transceiver in a base station (BS); and the indication comprises the trigger.

Aspect 6. The apparatus according to any of Aspects 1-5, wherein: the processor and the memory are further configured to detect an expiration of a periodic timer for switching to the second BWP; and the indication comprises the expiration of the periodic timer.

Aspect 7. The apparatus according to any of Aspects 1-6, wherein: the transceiver is further configured to transmit at least one of a buffer status report (BSR) or scheduling request (SR); and the indication comprises at least one of the BSR or the SR.

Aspect 8. The method according to any of Aspects 1-7, wherein: the transceiver is further configured to receive an uplink grant (UL); and the indication comprises the UL grant.

Aspect 9. The apparatus according to any of Aspects 1-7, wherein: the transceiver is further configured to: receive a third configuration of a third BWP, wherein the second BWP is configured for P frames and the third BWP is configured for the higher traffic rate for I frames, and receive another indication that a P frame is to be transmitted to the apparatus; and the processor and the memory are further configured to determine to switch to the second BWP, based on the other indication.

Aspect 10. An apparatus for wireless communications, comprising: a transceiver configured to transmit, to a user equipment (UE), a first configuration of a first bandwidth part (BWP) and a second configuration of a second BWP, wherein the first BWP is configured for a lower traffic rate and the second BWP is configured for a higher traffic rate; a memory; a processor coupled to the memory, the processor and the memory being configured to obtain an indication to cause the UE to switch from the first BWP to the second BWP for the transmissions to the UE; and wherein the transceiver is further configured to switch from the first BWP to the second BWP, for transmissions to the UE, in response to obtaining the indication.

Aspect 11. The apparatus of Aspect 10, wherein the first configuration includes a first minimum control-channel-to-data-channel delay for the first BWP, wherein the second configuration includes a second minimum control-channel-to-data-channel delay for the second BWP, and wherein the second minimum control-channel-to-data-channel delay less than the first minimum control-channel-to-data-channel delay.

Aspect 12. The apparatus according to any of Aspects 10 or 11, wherein: the first configuration includes at least one of a first periodicity for monitoring physical downlink control channels (PDCCHs) on the first BWP, a first bandwidth of the first BWP, or support for a first number of receive antennas for the first BWP; and the second configuration includes at least one of a second periodicity for monitoring PDCCHs on the second BWP, a second bandwidth of the second BWP, or support for a second number of receive antennas for the second BWP; the second periodicity is less than the first periodicity; the second bandwidth is greater than the first bandwidth; and the second number of receive antennas greater than the first number of receive antennas.

Aspect 13. The apparatus according to any of Aspects 10-12, wherein: the transceiver is further configured to obtain traffic for the UE at a physical layer of a protocol stack; and the indication comprises the arrival of the traffic for the UE at the physical layer.

Aspect 14. The apparatus according to any of Aspects 10-13, wherein: the transceiver is further configured to transmit a trigger to the UE at a medium access control (MAC) layer, radio link control (RLC) layer, or packet data convergence protocol (PDCP) layer of a protocol stack based on another indication to prepare for a burst of traffic; and the indication comprises sending the trigger to the UE.

Aspect 15. The apparatus according to any of Aspects 10-14, wherein: the processor and the memory are configured to detect an expiration of a periodic timer for switching to the second BWP; and the indication comprises the expiration of the periodic timer for switching to the second BWP.

Aspect 16. The apparatus according to any of Aspects 10-15, wherein: the transceiver is further configured to receive at least one of a buffer status report (BSR) or scheduling request (SR) from the UE; and the indication comprises at least one of the BSR or the SR.

Aspect 17. The apparatus according to any of Aspects 10-16, wherein: the transceiver is further configured to transmit an uplink (UL) grant to the UE; and the indication comprises the UL grant.

Aspect 18. The apparatus according to any of Aspects 10-17, wherein: the transmitter is further configured to transmit a third configuration of a third BWP, wherein the second BWP is configured for P frames and the third BWP is configured for the higher traffic rate for I frames; the processor and the memory are further configured to: obtain another indication that a P frame is to be transmitted to the UE, and determine to switch to the second BWP, based on the other indication.

Aspect 19. A method of wireless communications by a user equipment (UE), comprising: receiving a first configuration of a first bandwidth part (BWP) and a second configuration of a second BWP, wherein the first BWP is configured for a lower traffic rate and the second BWP is configured for a higher traffic rate; obtaining an indication to switch from the first BWP to the second BWP; and switching from the first BWP to the second BWP in response to obtaining the indication.

Aspect 20. The method of Aspect 19, wherein the first configuration includes a first minimum control-channel-to-data-channel delay for the first BWP, wherein the second configuration includes a second minimum control-channel-to-data-channel delay for the second BWP, and wherein the second minimum control-channel-to-data-channel delay is less than the first minimum control-channel-to-data-channel delay.

Aspect 21. The method according to any of Aspects 19-20, wherein the first configuration includes a first periodicity for monitoring physical downlink control channels (PDCCHs) on the first BWP, wherein the second configuration includes a second periodicity for monitoring PDCCHs on the second BWP, and wherein the second periodicity is less than the first periodicity.

Aspect 22. The method according to any of Aspects 19-21, wherein the first configuration includes a first bandwidth of the first BWP, wherein the second configuration includes a second bandwidth of the second BWP, and wherein the second bandwidth is greater than the first bandwidth.

Aspect 23. The method according to any of Aspects 19-22, wherein the first configuration supports a first number of receive antennas for the first BWP, wherein the second configuration supports a second number of receive antennas for the second BWP, and wherein the second number of receive antennas greater than the first number of receive antennas.

Aspect 24. The method according to any of Aspects 19-23, wherein the indication comprises a command to switch from the first BWP received by the UE.

Aspect 25. The method according to any of Aspects 19-24, wherein the indication comprises a trigger detected in a physical (PHY) layer of a transceiver in the UE, wherein the trigger is sent by at least one of a medium access control (MAC) layer, radio link control (RLC) layer, or packet data convergence protocol (PDCP) layer of a protocol stack in a transceiver in a base station (BS).

Aspect 26. The method according to any of Aspects 19-25, wherein the indication comprises expiration of a periodic timer for switching to the second BWP.

Aspect 27. The method according to any of Aspects 19-26, wherein the indication comprises at least one of a buffer status report (BSR) or scheduling request (SR) generated by the UE.

Aspect 28. The method according to any of Aspects 19-27, wherein the indication comprises an uplink (UL) grant received by the UE.

Aspect 29. The method according to any of Aspects 19-28, further comprising: receiving a third configuration of a third BWP, wherein the second BWP is configured for P frames and the third BWP is configured for the higher traffic rate for I frames; receiving another indication that a P frame is to be transmitted to the UE; and determining to switch to the second BWP, based on the other indication.

Aspect 30. A method of wireless communications by a base station (BS), comprising: transmitting, to a user equipment (UE), a first configuration of a first bandwidth part (BWP) and a second configuration of a second BWP, wherein the first BWP is configured for a lower traffic rate and the second BWP is configured for a higher traffic rate; obtaining an indication to cause the UE to switch from the first BWP to the second BWP for the transmissions to the UE; and switching from the first BWP to the second BWP, for transmissions to the UE, in response to obtaining the indication.

Aspect 31. The method of Aspect 30, wherein the first configuration includes a first minimum control-channel-to-data-channel delay for the first BWP, wherein the second configuration includes a second minimum control-channel-to-data-channel delay for the second BWP, and wherein the second minimum control-channel-to-data-channel delay less than the first minimum control-channel-to-data-channel delay.

Aspect 32. The method according to any of Aspects 30 or 31, wherein the first configuration includes a first periodicity for monitoring physical downlink control channels (PDCCHs) on the first BWP, wherein the second configuration includes a second periodicity for monitoring PDCCHs on the second BWP, and wherein the second periodicity is less than the first periodicity.

Aspect 33. The method according to any of Aspects 30-32, wherein the first configuration includes a first bandwidth of the first BWP, wherein the second configuration includes a second bandwidth of the second BWP, and wherein the second bandwidth is greater than the first bandwidth.

Aspect 34. The method according to any of Aspects 30-33, wherein the first configuration supports a first number of receive antennas for the first BWP, wherein the second configuration supports a second number of receive antennas for the second BWP, and wherein the second number of receive antennas greater than the first number of receive antennas.

Aspect 35. The method according to any of Aspects 30-34, wherein the indication comprises an arrival of traffic for the UE at a physical layer of a protocol stack in a transceiver in the BS.

Aspect 36. The method according to any of Aspects 30-35, wherein the indication comprises at least one of a medium access control (MAC) layer, radio link control (RLC) layer, or packet data convergence protocol (PDCP) layer of a protocol stack in a transceiver in the BS sending a trigger to the UE, wherein the trigger is sent based on another indication to prepare for a burst of traffic.

Aspect 37. The method according to any of Aspects 30-36, wherein the indication comprises expiration of a periodic timer for switching to the second BWP.

Aspect 38. The method according to any of Aspects 30-37, wherein the indication comprises at least one of a buffer status report (BSR) or scheduling request (SR) generated by the UE.

Aspect 39. The method according to any of Aspects 30-38, wherein the indication comprises an uplink (UL) grant transmitted to the UE by the BS.

Aspect 40. The method according to any of Aspects 30-39, further comprising: transmitting a third configuration of a third BWP, wherein the second BWP is configured for P frames and the third BWP is configured for the higher traffic rate for I frames; obtaining another indication that a P frame is to be transmitted to the UE; and determining to switch to the second BWP, based on the other indication.

Aspect 41. An apparatus for wireless communications, comprising: means for receiving a first configuration of a first bandwidth part (BWP) and a second configuration of a second BWP, wherein the first BWP is configured for a lower traffic rate and the second BWP is configured for a higher traffic rate; means for obtaining an indication to switch from the first BWP to the second BWP; and means for switching from the first BWP to the second BWP in response to obtaining the indication.

Aspect 42. The apparatus of Aspect 41, the apparatus having means to perform any of Aspects 19 through 29.

Aspect 43. An apparatus for wireless communications, comprising: means for transmitting, to a user equipment (UE), a first configuration of a first bandwidth part (BWP) and a second configuration of a second BWP, wherein the first BWP is configured for a lower traffic rate and the second BWP is configured for a higher traffic rate; means for obtaining an indication to cause the UE to switch from the first BWP to the second BWP for the transmissions to the UE; and means for switching from the first BWP to the second BWP, for transmissions to the UE, in response to obtaining the indication.

Aspect 44. The apparatus of Aspect 43, the apparatus having means to perform any of Aspects 30 through 40.

Aspect 45. A computer-readable medium having instructions stored thereon for: receiving a first configuration of a first bandwidth part (BWP) and a second configuration of a second BWP, wherein the first BWP is configured for a lower traffic rate and the second BWP is configured for a higher traffic rate; obtaining an indication to switch from the first BWP to the second BWP; and switching from the first BWP to the second BWP in response to obtaining the indication.

Aspect 46. The computer-readable medium of Aspect 45, the computer-readable medium having instructions stored thereon for performing any of Aspects 19 through 29.

Aspect 47. A computer-readable medium having instructions stored thereon for: transmitting, to a user equipment (UE), a first configuration of a first bandwidth part (BWP) and a second configuration of a second BWP, wherein the first BWP is configured for a lower traffic rate and the second BWP is configured for a higher traffic rate; obtaining an indication to cause the UE to switch from the first BWP to the second BWP for the transmissions to the UE; and switching from the first BWP to the second BWP, for transmissions to the UE, in response to obtaining the indication.

Aspect 48. The computer-readable medium of Aspect 47, the computer-readable medium having instructions stored thereon for performing any of Aspects 30 through 40.

Aspect 49. The apparatus according to any of Aspects 1-9, wherein the first BWP is configured for at least one of a first service or lower power consumption, and the second BWP is configured for at least one of a second service or higher power consumption.

Aspect 50. The apparatus according to any of Aspects 10-18, wherein the first BWP is configured for at least one of a first service or lower power consumption, and the second BWP is configured for at least one of a second service or higher power consumption.

Additional Considerations

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
   a transceiver configured to receive a first configuration of a first bandwidth part (BWP) and a second configuration of a second BWP, wherein the first BWP is configured for a lower traffic rate and the second BWP is configured for a higher traffic rate;
   a memory; and
   a processor coupled to the memory, the processor and the memory being configured to obtain an indication to switch from the first BWP to the second BWP, the indication comprising an expiration of a periodic timer for switching to the second BWP; and
   wherein the transceiver is further configured to switch from the first BWP to the second BWP in response to obtaining the indication.

2. The apparatus of claim 1, wherein the first configuration includes a first minimum control-channel-to-data-channel delay for the first BWP, wherein the second configuration includes a second minimum control-channel-to-data-channel delay for the second BWP, and wherein the second minimum control-channel-to-data-channel delay is less than the first minimum control-channel-to-data-channel delay.

3. The apparatus of claim 1, wherein:
   the first configuration includes at least one of a first periodicity for monitoring physical downlink control channels (PDCCHs) on the first BWP, a first bandwidth of the first BWP, or support for a first number of receive antennas for the first BWP;
   the second configuration includes a second periodicity for monitoring PDCCHs on the second BWP, a second bandwidth of the second BWP, or support for a second number of receive antennas for the second BWP;
   the second periodicity is less than the first periodicity;
   the second bandwidth is greater than the first bandwidth; and
   the second number of receive antennas greater than the first number of receive antennas.

4. The apparatus of claim 1, wherein the first BWP is configured for at least one of a first service or lower power consumption, and the second BWP is configured for at least one of a second service or higher power consumption.

5. The apparatus of claim 1, wherein:
   the transceiver is further configured to receive a command to switch from the first BWP; and
   the indication further comprises the command to switch from the first BWP.

6. The apparatus of claim 1, wherein:
   the transceiver is further configured to detect a trigger in a physical (PHY) layer, wherein the trigger is sent by at least one of a medium access control (MAC) layer, radio link control (RLC) layer, or packet data convergence protocol (PDCP) layer of a protocol stack in a transceiver in a base station (BS); and
   the indication further comprises the trigger.

7. The method of claim 1, wherein:
   the transceiver is further configured to receive an uplink grant (UL); and
   the indication further comprises the UL grant.

8. The apparatus of claim 1, wherein:
   the transceiver is further configured to:
     receive a third configuration of a third BWP, wherein the second BWP is configured for P frames and the third BWP is configured for the higher traffic rate for I frames, and
     receive another indication that a P frame is to be transmitted to the apparatus; and
   the processor and the memory are further configured to determine to switch to the second BWP, based on the other indication.

9. An apparatus for wireless communication, comprising:
   a transceiver configured to:
     receive a first configuration of a first bandwidth part (BWP) and a second configuration of a second BWP, wherein the first BWP is configured for a lower traffic rate and the second BWP is configured for a higher traffic rate; and
     transmit at least one of a buffer status report (BSR) or scheduling request (SR);
   a memory; and
   a processor coupled to the memory, the processor and the memory being configured to obtain an indication to switch from the first BWP to the second BWP, wherein the indication comprises at least one of the BSR or the SR; and wherein the transceiver is further configured to switch from the first BWP to the second BWP in response to obtaining the indication.

10. An apparatus for wireless communications, comprising:
a transceiver configured to transmit, to a user equipment (UE), a first configuration of a first bandwidth part (BWP) and a second configuration of a second BWP, wherein the first BWP is configured for a lower traffic rate and the second BWP is configured for a higher traffic rate;
a memory;
a processor coupled to the memory, the processor and the memory being configured to obtain an indication to cause the UE to switch from the first BWP to the second BWP for the transmissions to the UE, the indication comprising an expiration of a periodic timer for switching to the second BWP; and
wherein the transceiver is further configured to switch from the first BWP to the second BWP, for transmissions to the UE, in response to obtaining the indication.

11. The apparatus of claim 10, wherein the first configuration includes a first minimum control-channel-to-data-channel delay for the first BWP, wherein the second configuration includes a second minimum control-channel-to-data-channel delay for the second BWP, and wherein the second minimum control-channel-to-data-channel delay less than the first minimum control-channel-to-data-channel delay.

12. The apparatus of claim 10, wherein:
the first configuration includes at least one of a first periodicity for monitoring physical downlink control channels (PDCCHs) on the first BWP, a first bandwidth of the first BWP, or support for a first number of receive antennas for the first BWP; and
the second configuration includes at least one of a second periodicity for monitoring PDCCHs on the second BWP, a second bandwidth of the second BWP, or support for a second number of receive antennas for the second BWP;
the second periodicity is less than the first periodicity;
the second bandwidth is greater than the first bandwidth; and
the second number of receive antennas greater than the first number of receive antennas.

13. The apparatus of claim 10, wherein the first BWP is configured for at least one of a first service or lower power consumption, and the second BWP is configured for at least one of a second service or higher power consumption.

14. The apparatus of claim 10, wherein:
the transceiver is further configured to obtain traffic for the UE at a physical layer of a protocol stack; and
the indication further comprises the arrival of the traffic for the UE at the physical layer.

15. The apparatus of claim 10, wherein:
the transceiver is further configured to transmit a trigger to the UE at a medium access control (MAC) layer, radio link control (RLC) layer, or packet data convergence protocol (PDCP) layer of a protocol stack based on another indication to prepare for a burst of traffic; and
the indication further comprises the trigger.

16. The apparatus of claim 10, wherein:
the transceiver is further configured to transmit an uplink (UL) grant to the UE; and
the indication further comprises the UL grant.

17. The apparatus of claim 10, wherein:
the transmitter is further configured to transmit a third configuration of a third BWP, wherein the second BWP is configured for P frames and the third BWP is configured for the higher traffic rate for I frames;
the processor and the memory are further configured to:
obtain another indication that a P frame is to be transmitted to the UE, and
determine to switch to the second BWP, based on the other indication.

18. An apparatus for wireless communications, comprising:
a transceiver configured to:
transmit, to a user equipment (UE), a first configuration of a first bandwidth part (BWP) and a second configuration of a second BWP, wherein the first BWP is configured for a lower traffic rate and the second BWP is configured for a higher traffic rate; and
receive at least one of a buffer status report (BSR) or scheduling request (SR) from the UE;
a memory; and
a processor coupled to the memory, the processor and the memory being configured to obtain an indication to cause the UE to switch from the first BWP to the second BWP for the transmissions to the UE, wherein the indication comprises at least one of the BSR or the SR; and
wherein the transceiver is further configured to switch from the first BWP to the second BWP, for transmissions to the UE, in response to obtaining the indication.

19. A method of wireless communications by a user equipment (UE), comprising:
receiving a first configuration of a first bandwidth part (BWP) and a second configuration of a second BWP, wherein the first BWP is configured for a lower traffic rate and the second BWP is configured for a higher traffic rate;
obtaining an indication to switch from the first BWP to the second BWP, wherein the indication comprises expiration of a periodic timer for switching to the second BWP; and
switching from the first BWP to the second BWP in response to obtaining the indication.

20. The method of claim 19, wherein the indication further comprises a command to switch from the first BWP received by the UE.

21. The method of claim 19, wherein the indication further comprises a trigger detected in a physical (PHY) layer of a transceiver in the UE, wherein the trigger is sent by at least one of a medium access control (MAC) layer, radio link control (RLC) layer, or packet data convergence protocol (PDCP) layer of a protocol stack in a transceiver in a base station (BS).

22. The method of claim 19, wherein the indication comprises an uplink (UL) grant received by the UE.

23. A method of wireless communications by a user equipment (UE), comprising:
receiving a first configuration of a first bandwidth part (BWP) and a second configuration of a second BWP, wherein the first BWP is configured for a lower traffic rate and the second BWP is configured for a higher traffic rate;
obtaining an indication to switch from the first BWP to the second BWP, wherein the indication comprises at least one of a buffer status report (BSR) or scheduling request (SR) generated by the UE; and switching from the first BWP to the second BWP in response to obtaining the indication.

24. A method of wireless communications by a base station (BS), comprising:
- transmitting, to a user equipment (UE), a first configuration of a first bandwidth part (BWP) and a second configuration of a second BWP, wherein the first BWP is configured for a lower traffic rate and the second BWP is configured for a higher traffic rate;
- obtaining an indication to cause the UE to switch from the first BWP to the second BWP for the transmissions to the UE, wherein the indication comprises expiration of a periodic timer for switching to the second BWP; and
- switching from the first BWP to the second BWP, for transmissions to the UE, in response to obtaining the indication.

25. The method of claim 24, wherein the indication further comprises an arrival of traffic for the UE at a physical layer of a protocol stack in a transceiver in the BS.

26. The method of claim 24, wherein the indication further comprises at least one of a medium access control (MAC) layer, radio link control (RLC) layer, or packet data convergence protocol (PDCP) layer of a protocol stack in a transceiver in the BS sending a trigger to the UE, wherein the trigger is sent based on another indication to prepare for a burst of traffic.

27. The method of claim 24, wherein the indication further comprises an uplink (UL) grant transmitted to the UE by the BS.

28. A method of wireless communications by a base station (BS), comprising:
- transmitting, to a user equipment (UE), a first configuration of a first bandwidth part (BWP) and a second configuration of a second BWP, wherein the first BWP is configured for a lower traffic rate and the second BWP is configured for a higher traffic rate;
- obtaining an indication to cause the UE to switch from the first BWP to the second BWP for the transmissions to the UE, wherein the indication comprises at least one of a buffer status report (BSR) or scheduling request (SR) generated by the UE; and
- switching from the first BWP to the second BWP, for transmissions to the UE, in response to obtaining the indication.

* * * * *